US009259890B2

(12) United States Patent
Narita et al.

(10) Patent No.: US 9,259,890 B2
(45) Date of Patent: Feb. 16, 2016

(54) DEWATERING METHOD FOR CORRECTING WATER CONTENT OF GREEN VENEER FOR PLYWOOD AND APPARATUS FOR DEWATERING THE GREEN VENEER

(75) Inventors: Mitsumasa Narita, Komaki (JP); Yasuyuki Ohdaira, Komaki (JP)

(73) Assignee: TAIHEI MACHINERY WORKS, LTD., Komaki-Shi, Aichi (JP)

( * ) Notice: Subject to any disclaimer, the term of this patent is extended or adjusted under 35 U.S.C. 154(b) by 297 days.

(21) Appl. No.: 13/539,659

(22) Filed: Jul. 2, 2012

(65) Prior Publication Data
US 2014/0000464 A1 Jan. 2, 2014

(51) Int. Cl.
*B30B 9/04* (2006.01)
*B30B 9/06* (2006.01)
*B30B 9/10* (2006.01)
(Continued)

(52) U.S. Cl.
CPC . *B30B 9/047* (2013.01); *B27D 3/00* (2013.01); *B30B 9/06* (2013.01); *B30B 9/105* (2013.01); *B30B 15/24* (2013.01); *B32B 38/0012* (2013.01); *B32B 38/164* (2013.01); *B32B 2038/166* (2013.01); *B32B 2305/77* (2013.01);
(Continued)

(58) Field of Classification Search
CPC ............ B30B 9/02; B30B 9/04; B30B 9/047; B30B 9/105; B30B 9/06; B30B 15/24; B32B 38/0012; B32B 38/164; B32B 2451/00; B32B 2038/166; B32B 2309/12; B32B 2305/77; B27D 3/00; F26B 5/14; F26B 7/00; B27M 1/02

USPC ................. 100/35, 37; 144/246.1, 254, 256.2, 144/256.3, 256.4, 259, 260, 261, 271, 284, 144/329, 330, 358, 359
See application file for complete search history.

(56) References Cited

U.S. PATENT DOCUMENTS 2,148,704 A * 2/1939 Merritt ............................ 100/48
3,318,014 A * 5/1967 Whitlow ......................... 34/381
(Continued)

FOREIGN PATENT DOCUMENTS

CA 1151415 8/1983
JP 2002-166403 6/2002
(Continued)

OTHER PUBLICATIONS

Canadian Office Action mailed Oct. 16, 2013 for application 2,778,862.
(Continued)

*Primary Examiner* — Alexander P Taousakis
*Assistant Examiner* — Leonel Vasquez
(74) *Attorney, Agent, or Firm* — Thomas | Horstemeyer, LLP

(57) ABSTRACT

A large number of green veneers for plywood respectively having high water contents and formed in a rectangular shape are vertically laminated to obtain a veneer laminate having a quadrangular prismatic shape. The veneer laminate is located between upper and lower platen members so that two opposite side faces of the veneer laminate vertically form cut face gathering planes. The upper and lower platen members are moved toward each other to apply a pressing force to the veneer laminate. The pressing force applied to the veneer laminate is released or weakened while the water drawn through the cut face gathering planes by the pressing force is dripping downward along the cut face gathering planes of the veneer laminate vertically formed.

6 Claims, 28 Drawing Sheets

(51) Int. Cl.
*B30B 15/24* (2006.01)
*B27D 3/00* (2006.01)
*B32B 38/00* (2006.01)
*B32B 38/16* (2006.01)

(52) U.S. Cl.
CPC ......... *B32B 2309/12* (2013.01); *B32B 2451/00* (2013.01); *F26B 2210/14* (2013.01)

(56) References Cited

U.S. PATENT DOCUMENTS 4,188,730 A * 2/1980 Allen et al. ...................... 34/380
5,564,199 A * 10/1996 Yamamoto et al. ............. 34/398
5,875,710 A * 3/1999 Honda et al. ................... 100/196
2006/0278336 A1* 12/2006 Sundholm et al. ............. 156/312

FOREIGN PATENT DOCUMENTS

JP 2010-197004 9/2010
JP 2010197004 9/2010
WO WO 9426485 A1 * 11/1994 ............... B27M 1/02

OTHER PUBLICATIONS

English translation of the Abstract for JP 2010197004 published on Sep. 9, 2010.
English translation of abstract of JP 2002-166403.
English translation of abstract of JP 2010-197004.

* cited by examiner

↓ : dripping water (side face)

↓↓ : dripping water (front face)

↓ : water transfer

→ : water transfer

FIG.22B

1) Cycle of pressing → release → pressing, three to five times

| dewatering pressure kg/cm² | 10 | | 15 | | | 20 | | | 30 | | | 40 | | | 50 | | | 60 | | |
|---|---|---|---|---|---|---|---|---|---|---|---|---|---|---|---|---|---|---|---|---|
| release pressure kg/cm² | 0 | 5 | 0 | 5 | 10 | 0 | 5 | 10 | 0 | 5 | 10 | 0 | 5 | 10 | 0 | 5 | 10 | 0 | 5 | 10 |
| water content uniformity | △ | △ | ○ | ○ | ○ | ◎ | ◎ | ○ | ◎ | ◎ | ○ | ◎ | ◎ | ◎ | ◎ | ◎ | ◎ | ○ | ○ | ○ fractures in part of green veneers |

- Water content uniformity
  - ◎ very good
  - ○ good
  - △ not good

2) Cycle of pressing → release → pressing, once or twice

| dewatering pressure kg/cm² | 10 | | 15 | | | 20 | | | 30 | | | 40 | | | 50 | | | 60 | | |
|---|---|---|---|---|---|---|---|---|---|---|---|---|---|---|---|---|---|---|---|---|
| release pressure kg/cm² | 0 | 5 | 0 | 5 | 10 | 0 | 5 | 10 | 0 | 5 | 10 | 0 | 5 | 10 | 0 | 5 | 10 | 0 | 5 | 10 |
| water content uniformity | △ | △ | ○ | ○ | ○ | ○ | ○ | ○ | ○ | ○ | ○ | ○ | ○ | ○ | ○ | ○ | ○ | ○ | ○ | ○ fractures in part of green veneers |

- Water content uniformity
  - ◎ Very good
  - ○ Good
  - △ Not good

DEWATERING METHOD FOR CORRECTING WATER CONTENT OF GREEN VENEER FOR PLYWOOD AND APPARATUS FOR DEWATERING THE GREEN VENEER

BACKGROUND OF THE INVENTION

1. Field of the Invention

The invention relates to a dewatering method for correcting water contents of green veneers for plywood. In the dewatering method, a pressure is vertically applied to a large number of vertically laminated green veneers for plywood so that the green veneers are compressed and dewatered for reduction of water contents of the green veneers. The invention also relates to an apparatus for dewatering the green veneers.

2. Description of the Related Art

Describing a plywood production process often employed, a log being rotated is peeled into thin band plates by the use of a lathe (plane), green veneers are obtained by cutting the peeled band plates in predefined dimensions and then dried, and a plurality of the green veneers is bonded to produce the plywood. In the process, the green veneers are compressed and dewatered by applying a pressure to the green veneers before the drying step because it is time-consuming to immediately dry the obtained green veneers.

The water contents of the respective green veneers thus dewatered are desirably as equal as possible not only among the laminated green veneers but also in different parts of each green veneer. A large difference between the water contents leads to a lengthy drying step and makes it difficult for the green veneers to be equally dried, in which case the water contents are still different from one green veneer to another and in different parts of one green veneer after the drying step. When the green veneers thus having different water contents are laminated to produce the plywood, warp and/or distortion is likely to occur.

Comparing sapwood and core pieces respectively obtained from outer layers and a core part of the log, the water contents of each green veneer before compressing step are largely different. For example, the water content of the sapwood is twice to three times as large as a relatively low water content of the wood core. When the sapwood and core pieces, each one of which is inadequate and unusable as a veneer, are joined and used as a patched veneer, the veneer may have water contents two-fold to three-fold different from one another in different parts of the patched veneer. In some of such green veneers, there may be differences by several-ten percentages or more among the water contents in different parts of one green veneer. The Applicant was granted two patents in Japan last year, U.S. Pat. No. 4,783,862 and U.S. Pat. No. 4,783,863 (both registered on Jul. 15, 2011). This invention is an independent invention distinctly different from these two patented inventions.

[Patent Document 1] Japanese Laid-Open Patent Publication No. 2002-166403

[Patent Document 2] Japanese Laid-Open Patent Publication No. 2010-197004

The Patent Document 1 discloses a roller dewatering apparatus. In the apparatus, green veneers are each transported through between squeeze rollers to be thereby pressed and dewatered. This apparatus which dewaters the green veneers one by one needs an extensive time for its whole operation. Further, the apparatus, wherein all of the green veneers are uniformly pressed by the rollers, is unable to correct a variability of water contents among the different green veneers.

The Patent Document 2 discloses a dewatering apparatus configured for laminate collective compression. In the apparatus, laminated green veneers are pressed collectively from an upper direction to be dewatered. The apparatus thus dewatering all of the green veneers at once achieves a better dewatering efficiency. However, the apparatus is similarly unable to correct a variability of water contents, whether they are different water contents among the green veneers and/or different water contents in different parts of one green veneer.

SUMMARY OF THE INVENTION

Problem to be Solved by the Invention

The invention provides a method and an apparatus for dewatering a plurality of green veneers while reducing a variability of water contents during the dewatering treatment.

Means for Solving Problems and Operational Effect

The invention provides a dewatering method as described below. A large number of green veneers for plywood respectively having high water contents and formed in a rectangular shape are vertically laminated. Cut faces of the green veneers for plywood, which are end faces of the green veneers for plywood intersecting with a direction of fibers, are vertically aligned. The veneer laminate is located between upper and lower platen members so that two opposite side faces of the veneer laminate vertically form cut face gathering planes. The upper and lower platen members are moved toward each other to apply a pressing force in the range of 15 to 50 $kg/cm^2$ (or more preferably in the range of 20 to 40 $kg/cm^2$) to the large number of laminated green veneers for plywood constituting the veneer laminate. Accordingly, water contained in the green veneers for plywood is drawn through the cut faces of the green veneers and drips downward along the cut face gathering planes vertically formed where the cut faces of the green veneers for plywood are gathered. The pressing force applied to the veneer laminate is released or weakened in the range of 0 to 10 $kg/cm^2$ (or more preferably in the range of 0 to 5 $kg/cm^2$) while the water is dripping downward so that the cut faces and fibers inside of the green veneers for plywood spread in a direction of original shape of the green veneers, generating a negative pressure. The water dripping downward along the cut face gathering planes is suctioned into fibers of the green veneer having a relatively low water content by a suctioning action generated from the cut faces toward the inside by the negative pressure. Then, the pressing force in the range of 15 to 50 $kg/cm^2$ is applied again to the large number of green veneers for plywood. As a result of at least one cycle of these steps that ends with the application of pressing force, a variability of the water contents in the veneer laminate is lessened among the green veneers for plywood and in different parts of each of the green veneers for plywood while an overall water content of the veneer laminate is reduced.

The veneer laminate is thus pressed by the upper and lower platen members to be dewatered and the pressing force applied to the veneer laminate is released or weakened while the water is dripping along the cut faces (perpendicular walls) of the veneer laminate. Therefore, the compressed veneer laminate swells under its own elasticity, generating the negative pressure in the fibers of the green veneers, and the dripping water is suctioned into the fibers by the negative pressure. Then, the water drawn from the green veneer or parts of the green veneer having the water content relatively high is transferred to the green veneer or parts of the green veneer having the water content relatively low. Thus, the green veneers are dewatered such that the water contents have a less variability from one green veneer to another and in different parts of one green veneer. Therefore, the green veneers can be thereafter dried efficiently with less time. When a plurality of green veneers is bonded to obtain a sheet of plywood, the plywood obtained as a product is unlikely to warp or distort because the water contents of the green veneers used in the plywood are not as different from one green veneer to another and/or in different parts of one green veneer.

According to an aspect of the invention, a plurality of cycles of the pressing force application—releasing steps or the pressing force application—weakening steps by the upper and lower platen members to the veneer laminate are repeatedly performed and end with the application of pressing force while the water drawn by the pressing force is dripping downward along the cut face gathering planes vertically formed.

According to the method, the water is transferred from the green veneer or parts of the green veneer having the water content relatively high to the green veneer or parts thereof having the water content relatively low. Then, the green veneers are compressed again so that the water is discharged from the fibers of the green veneers. When the water discharge, the water suction, and the water discharge again are performed repeatedly, the green veneers can be dewatered such that the variability of water contents is more effectively lessened from one green veneer to another and/or in different parts of one green veneer.

The invention provides a green veneer dewatering apparatus as described below. A large number of green veneers for plywood are vertically laminated to obtain a veneer laminate, and the veneer laminate is subject to a pressing force vertically applied to the veneer laminate to be compressed and dewatered to reduce a water content of the veneer laminate. The apparatus includes:

a support platen supporting the veneer laminate;

a pressing member provided in an upper part of the support platen and movable toward and away from the support platen;

a pressing cylinder adapted to drive and push the pressing member against the veneer laminate;

a regulating member provided so as to vertically move relative to the support platen, the regulating member being adapted to stand upright from the support platen to be in contact with or closely adjacent to perpendicular walls on at least two opposite sides of the veneer laminate and thereby regulate movement or extension of the veneer laminate while the veneer laminate is being pressed by the pressing member, the regulating member further being adapted to abut the pressing member moving downward to thereafter move downward integral with the pressing member;

a lifting and lowering device adapted to lift and lower the regulating member to and from an upright standing position; and a control device adapted to control the pressing cylinder which drives the pressing member, the control device including:

a dewatering pressing stopper which controls the pressing cylinder so that the pressing force applied by the pressing member to the veneer laminate for dewatering is released or weakened in the range of 0 to 10 kg/cm$^2$ (or more preferably in the range of 0 to 5 kg/cm$^2$) and the application of pressing force for dewatering stops while the veneer laminate is being pressed and dewatered by the pressing member under the pressing force in the range of 15 to 50 kg/cm$^2$ (or more preferably in the range of 20 to 40 kg/cm$^2$); and a dewatering pressing restarter which controls the pressing cylinder so that the pressing force applied by the pressing member to the veneer laminate for dewatering is increased in the range of 15 to 50 kg/cm$^2$ (or more preferably in the range of 20 to 40 kg/cm$^2$) to restart the application of pressing force for dewatering, wherein at least one cycle of the application of pressing force for dewatering and the stop of pressing force for dewatering is performed and ends with the application of pressing force for dewatering.

According to the apparatus, the regulating member reduces a likelihood of fracture in end portions of the green veneers that may be caused by the pressing force applied to the veneer laminate, making it difficult for the green veneers to be damaged by the dewatering treatment.

According to an aspect of the invention, the control device controlling the pressing cylinder includes: a first pressing stopper adapted to, in a step for subjecting the veneer laminate to a first pressing performed by the pressing member, release or weaken the pressing force applied by the pressing member while the water contained in the veneer laminate is being discharged from the veneer laminate by controlling the pressing cylinder so that the first pressing stops; and a second pressing starter adapted to restart the application of the pressing force to the veneer laminate by controlling the pressing cylinder so that a second pressing is performed by the pressing member.

Because the pressing force applied by the pressing member is released or weakened while the water is dripping along the perpendicular walls of the veneer laminate during the first pressing, the compressed veneer laminate starts to swell under its own elasticity, generating a negative pressure in the fibers of the green veneers. Then, the water dripping downward is suctioned by the negative pressure into the fibers of the green veneers, and the water discharged from the green veneer or any parts of the green veneer having the water content relatively high is transferred to the green veneer or parts of the green veneer having the water content relatively low. When the veneer laminate is compressed to be pressed and dewatered again in the second pressing for further water discharge, difference in the water contents are further reduced among the green veneers and/or in different parts of one green veneer during the dewatering treatment.

According to another aspect of the invention, the regulating member is positioned along the perpendicular walls on two opposite sides of the veneer laminate in a direction intersecting with the direction of fibers so that a stretch of the veneer laminate in the direction intersecting with the direction of fibers is regulated during the application of the pressing force.

This prevents or reduces a likelihood of any stretch of the end portions of the green veneers in the direction intersecting with the direction of fibers, making it difficult for the end portions to fracture.

According to still another aspect of the invention, the apparatus includes a pair of the regulating members facing each other along the perpendicular walls on opposite two sides of the veneer laminate, and a lateral movement device adapted to move one of the pair of the regulating members toward the other regulating member. The lifting and lowering device locates one of the pair of the regulating members at a standby position below a veneer supporting surface of the support platen when ready to place the veneer laminate on the support platen, and then lifts the one of the pair of the regulating members so as to stand upright on the support platen after the veneer laminate is placed on the support platen. The lateral movement device moves the one of the pair of the regulating members toward the other regulating member so that the veneer laminate is thereby sandwiched from two sides intersecting with the direction of fibers.

According to the apparatus, neither of the regulating members interferes with the veneer laminate when placed on the support platen, and the veneer laminate is sandwiched by the regulating members from two sides because one of the regulating members is moved toward the other regulating member after the veneer laminate is placed on the support platen. As a result, any stretch and fracture of the end portions of the green veneers are more effectively prevented or less likely while the pressing force is being applied to the green veneers.

In the apparatus according to still another aspect of the invention, a plurality of the pressing cylinders is coupled at different positions with the pressing member of pressing cylinders to drive the pressing member, and a plurality of lifting cylinders is coupled at different positions with the pressing member. The lifting cylinders are driven when the pressing member is lifted to return to a lift-up position after the pressing of the veneer laminate by the pressing member is over. The apparatus further includes: a stroke distance measuring device adapted to measure a stroke distance of each of the lifting cylinders that follow the plurality of the pressing cylinders while the plurality of the pressing cylinders is pressing the veneer laminate by the use of the pressing member; and a per-cylinder control device adapted to individually control the plurality of the pressing cylinders so as to lessen a deviation between the stroke distances of the lifting cylinders measured by the measuring device or a tilt of the pressing member calculated from the deviation.

According to the apparatus, the lifting cylinders having outputs relatively small but large enough to lift the pressing member are used to return the pressing member to the lift-up position, making it unnecessary to drive the pressing cylinders with very large outputs. This leads to energy saving. Further, in the apparatus, the stroke distances of the plurality of lifting cylinders is measured and the plurality of pressing cylinders is individually controlled so that the tilt of the pressing member is corrected based on the measured values. The apparatus can horizontally retain the veneer laminate as equally in height as possible during the pressing, thereby evenly dewatering the veneer laminate.

BRIEF DESCRIPTION OF THE DRAWINGS

FIG. 22B is a table illustrating a relationship among dewatering pressure, release pressure, and water content uniformity;

EXEMPLARY EMBODIMENT FOR CARRYING OUT THE INVENTION

Figure 1:
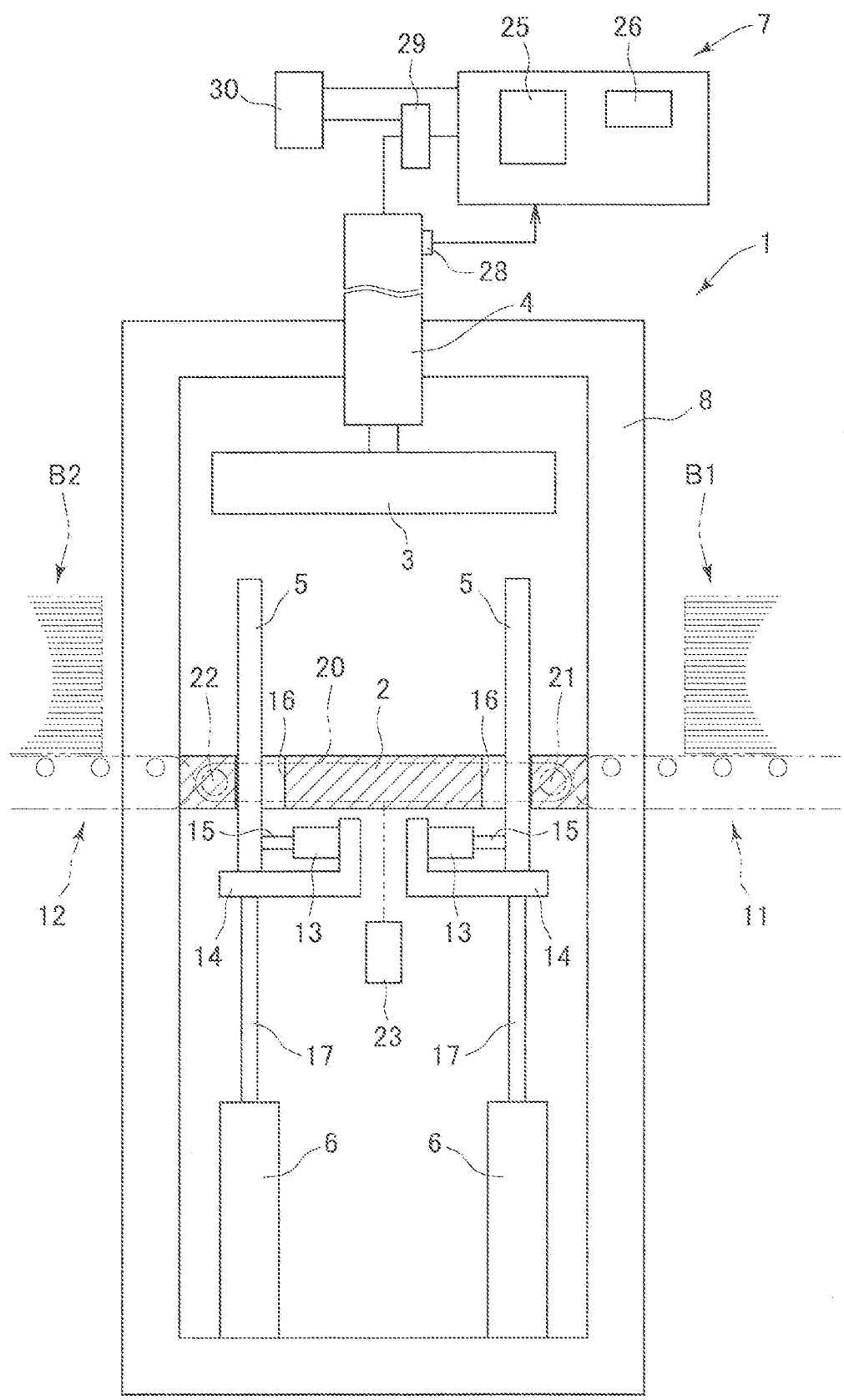
FIG. 1 is a front view conceptually and schematically illustrating an apparatus suitably used in a dewatering method according to the invention.

An exemplary embodiment of the invention is described referring to examples illustrated in the accompanied drawings. First, a dewatering apparatus for correcting water contents suitably used in a method according to the invention is described. Then, examples of the method according to the invention are described in a manner that corresponds to the description of operations of the apparatuses. FIG. 1 illustrates a green veneer dewatering apparatus 1 adapted to vertically apply a pressing force and thereby compress a veneer laminate (green veneer laminate) composed of a large number of vertically laminated green veneers for plywood to dewater the veneer laminate for reduction of a water content of the veneer laminate. The green veneer dewatering apparatus 1 has a support platen 2 supporting the veneer laminate, a press platen 3 provided in an upper section of the support platen 2 and serving as a pressing member movable toward and away from the support platen 2, a pressing cylinder 4 adapted to drive the press platen 3 and push the press platen 3 against the veneer laminate, a pair of regulating members 5 provided so as to vertically move relative to the support platen 2, the regulating members 5 being adapted to stand upright from the support platen 2 to be in contact with or closely adjacent to perpendicular walls on at least two opposite sides of the veneer laminate to thereby regulate movement or stretch of the veneer laminate while the veneer laminate is being pressed by the press platen 3, the regulating members 5 further being adapted to abut the press platen 3 moving downward to thereafter move downward integral with the press platen 3, a lifting and lowering cylinder 6, which is an example of the lifting and lowering device, adapted to lift and lower the regulating members 5 to and from the upright standing position, and a pressing controller 7, which is an example of the control device, adapted to control the pressing cylinder 4 which drives the press platen 3. The support platen 2 and the press platen 3 are examples of the upper and lower platen members.

The support platen 2, the pressing cylinder 4, and the lifting and lowering cylinder 6 are secured to a frame 8. The frame 8 is formed in a box shape, and the support platen 2 is located so as to horizontally traverse the frame 8. A transport-in conveyer 11 which transports a veneer laminate B1 to the support platen 2 is connected to one side of the support platen 2, and a transport-out conveyer 12 which transports a veneer laminate B2 already compressed and dewatered from the support platen 2 is connected to the other side of the support platen 2.

The pair of regulating members 5 each has a planar (plate-like) shape facing perpendicular walls on opposite two sides of the veneer laminate B1 and stand upright in parallel with each other. The green veneers have a square-like shape (conventionally, rectangular shape). When a direction of fibers and a direction intersecting with the direction of fibers are identified in the green veneer, the two perpendicular walls on two sides are in parallel with the direction of fibers. Therefore, a pair of the regulating members 5 is facing each other in the direction intersecting with the direction of fibers of the green veneers, and end faces of the fibers of the green veneers are exposed in a direction orthogonal to a plane of paper in the illustration of FIG. 1. These end faces constitute cut face gathering planes where cut faces of the green veneers are gathered.

As an example of the lateral movement device, lateral movement cylinders 13 and 13 are provided to move one of the pair of regulating members 5 toward the other regulating member 5. The lateral movement cylinders 13 and 13 are respectively connected to the regulating members 5. The lateral movement cylinders 13 and 13 are secured to lifting and lowering bases 14, and piston rods 15 of lateral movement cylinders 13 are coupled with the regulating members 5. The pair of regulating members 5 each stands upright to extend upward through moving spaces 16 formed in the support platen 2. The regulating members 5 are horizontally movable relative to the lifting and lowering bases 14 while retaining their upright positions within the moving spaces 16. When at least one of the lateral movement cylinders 15 is driven to laterally move one of the regulating members 5 toward the other regulating member 5, the veneer laminate B1 is thereby sandwiched from two sides in the direction intersecting with the direction of fibers.

The lifting and lowering bases 14 are coupled with piston rods 17 of lifting and lowering cylinders 6 and 6 vertically installed. The regulating members 5 are coupled with the lifting and lowering cylinders 6 via the lifting and lowering bases 14 which respectively support the lateral movement cylinders 13. The lifting and lowering cylinders 6 each has a stroke which lifts and lowers each of the regulating members 5 between an upright standing position where an upper end of each of the regulating members 5 protrudes upward through the support platen 2 beyond a height dimension of the veneer laminate B1 and a standby position below an upper surface of the support platen 2. The lifting and lowering cylinders 6 each has a vertical guide member vertically formed, not illustrated in the drawings, which directly guides each of the regulating members 5 upward and downward or indirectly guides each of the regulating members 5 by the use of a fitment formed integral with each of the regulating members 5. When the regulating member 5 on the side of the transport-in conveyer 11 alone is at the standby position below the upper surface of the support platen 2 in the apparatus illustrated in FIG. 1, the veneer laminate B1 is transported onto the support platen 2. When at least the regulating member 5 on the side of the transport-out conveyer 12 is at the standby position below the upper surface of the support platen 2 in the apparatus, the dewatered veneer laminate B2 is transported from the support platen 2.

The support platen 2 has therein a built-in conveyer 20 adapted to lift itself slightly above the upper surface of the support platen 2. The built-in conveyer 20 is, for example, a chain conveyer driven being supported by sprockets 21 and 22 provided on both end sides of the support platen 2. The conveyer 20 is moved by a lifting and lowering device 23 (for example, lifting and lowering cylinder) to and from a transport position slightly above the upper surface of the support platen 2 and a standby position below the upper surface. The built-in conveyer 20, when driven at the transport position slightly above the upper surface, guides the veneer laminate B1 transported by the transport-in conveyer 11 to the support platen 2. When the conveyer 20 is retreated to the standby position, the veneer laminate B1 is placed on the upper surface of the support platen 2. The dewatered veneer laminate B2 is slightly lifted when the built-in conveyer 20 is lifted by the lifting and lowering device 23 and transported by the built-in conveyer 20 from the support platen 2 toward the transport-out conveyer 12 and thereby received by the transport-out conveyer 12.

The pressing controller 7 which controls the pressing cylinder 4 has a first pressing stopper adapted to, in a step for subjecting the veneer laminate B1 to a first pressing performed by the press platen 3, release or weaken a pressing force applied by the press platen 3 while the water contained in the veneer laminate B1 is being discharged from the veneer laminate B1 by controlling the pressing cylinder 4 so that the first pressing stops; and a second pressing starter adapted to restart the application of the pressing force to the veneer laminate B1 by controlling the pressing cylinder 4 so that a second pressing is performed by the press platen 3. More specifically, the pressing controller 7 includes: at least a sequence program 25 run by a CPU to control a pressing pattern of the pressing cylinder; and a timer 26 measuring pressing times and pressing-release times. The controller 7 is connected to a pressure sensor 28 which detects a pressure level of the pressing cylinder 4, an electromagnetic valve 29 which controls a fluid pressure (normally, oil pressure) to the pressing cylinder 29, and, if necessary, a pressing force source such as an oil pressure pump 30. The first pressing stopper and the second pressing starter include the sequence program 25 and the timer 26.

Next, operation steps of the green veneer dewatering apparatus 1 as described above are hereinafter described. The description given below includes details of the sequence program 25 of the pressing controller 7 and an example of the dewatering method for correcting water contents according to the invention.

Figure 2:
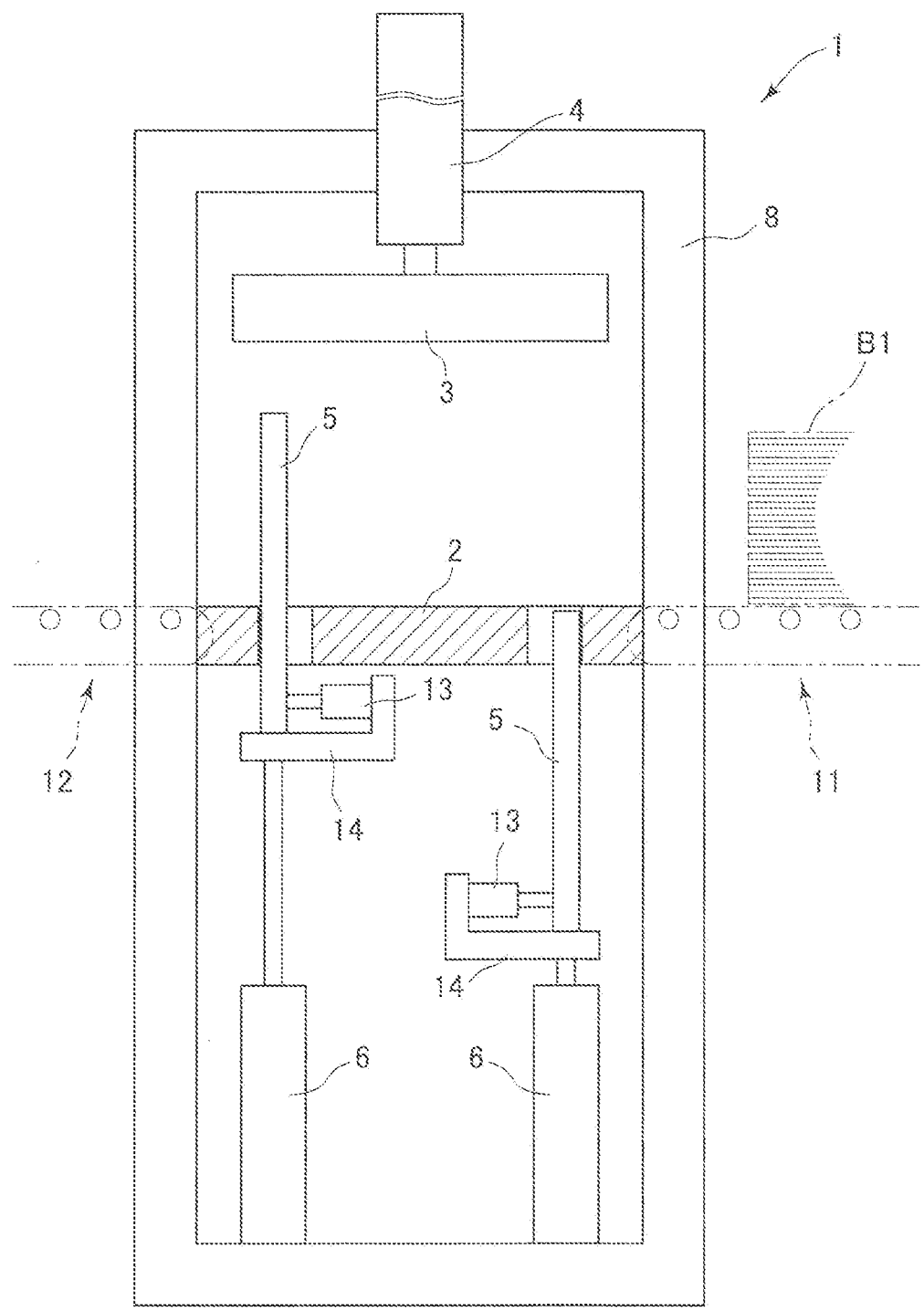
FIG. 2 is a front view which corresponds to FIG. 1, illustrating a step of the dewatering method according to the invention relevant to an operation of the apparatus.

When the veneer laminate B1 is transported by the transport-in conveyer 11 as illustrated in FIG. 1, the regulating member 5 on the side of the transport-in conveyer 11 is moved downward by the lifting and lowering cylinder 6 to the standby position below the upper surface of the support platen 2 as illustrated in FIG. 2, whereas the other regulating member 5 on the side of the transport-out conveyer 12 stays upright beyond the height dimension of the veneer laminate B1.

Figure 3:
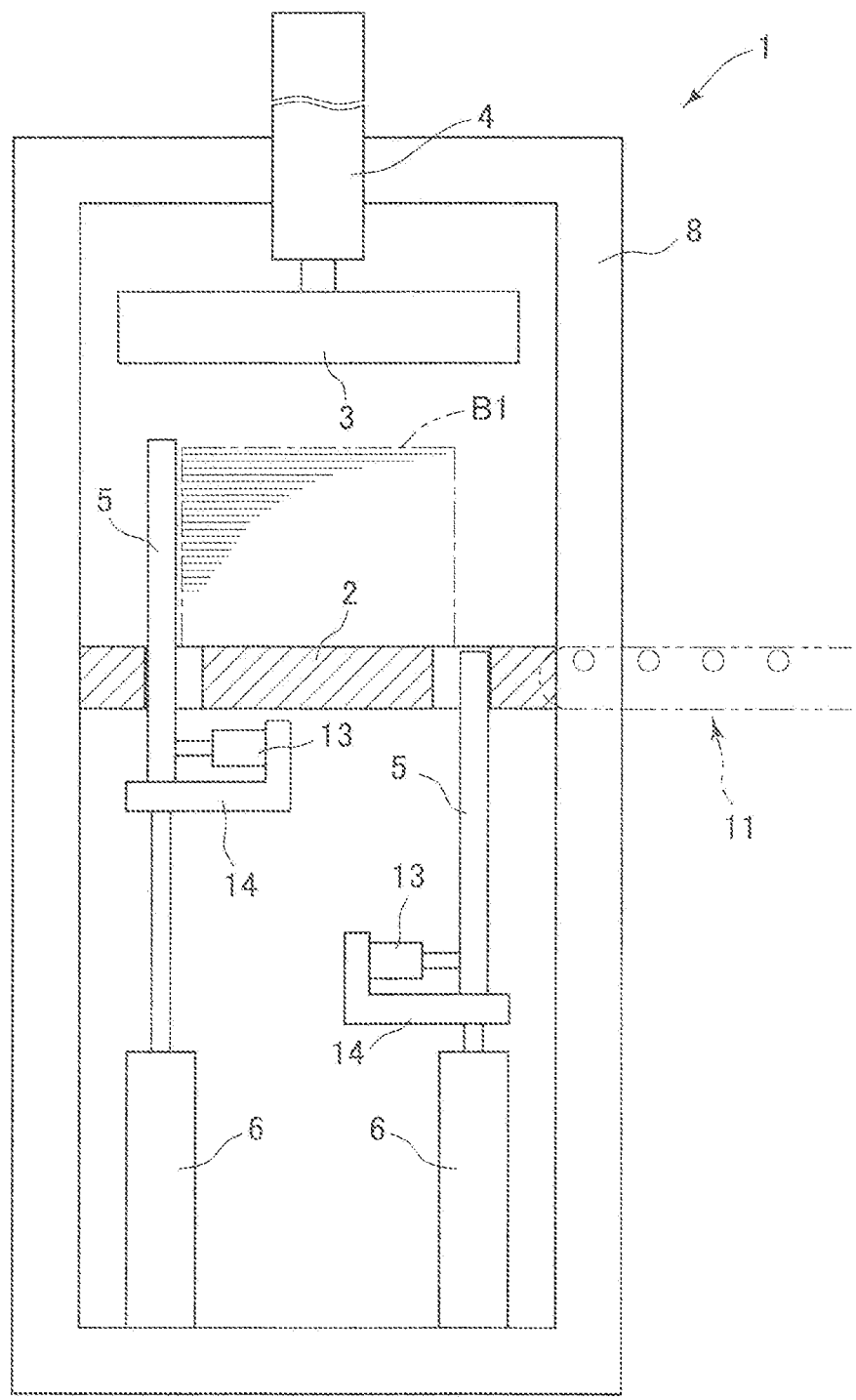
FIG. 3 is a front view, similarly illustrating an operation and a step of the method subsequent to the illustration of FIG. 2.
Figure 4:
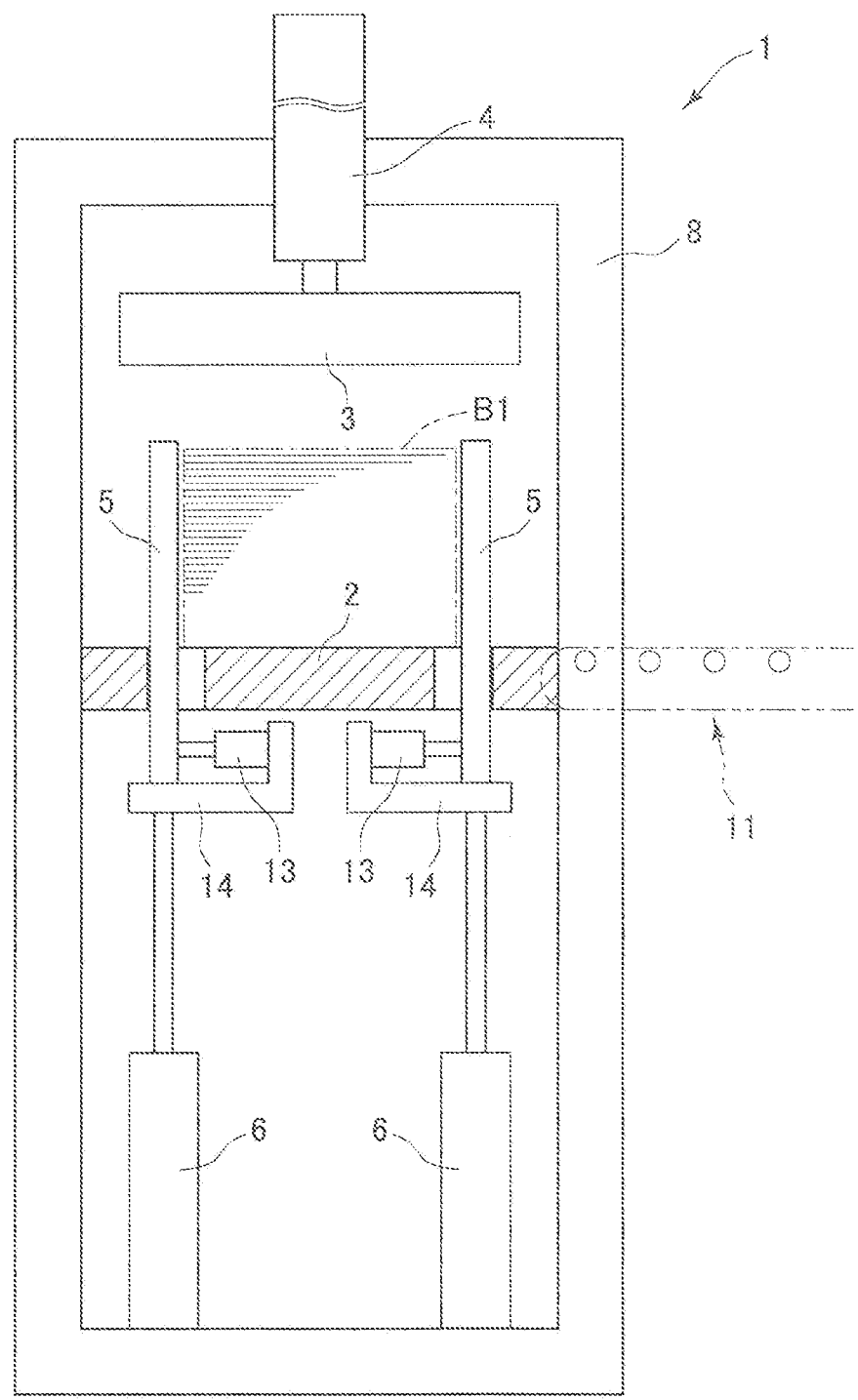
FIG. 4 is a front view, similarly illustrating an operation and a step of the method subsequent to the illustration of FIG. 3.

Next, the built-in conveyer 20 illustrated in FIG. 1 is driven, and the veneer laminate B1 on the transport-in conveyer 11 is received by the built-in conveyer 20 and then placed on the support platen 2 as illustrated in FIG. 3. At the time, the built-in conveyer 20 is slightly above the upper surface of the support platen 2, and the veneer laminate B1 on the built-in conveyer 20 is afloat. Then, the regulating member 5 below the support platen 2 is lifted from the support platen 2 by the lifting and lowering cylinder 6 to a position equal to the veneer laminate B1 in height or is lifted a little beyond the position so as to protrude as illustrated in FIG. 4.

Figure 5:
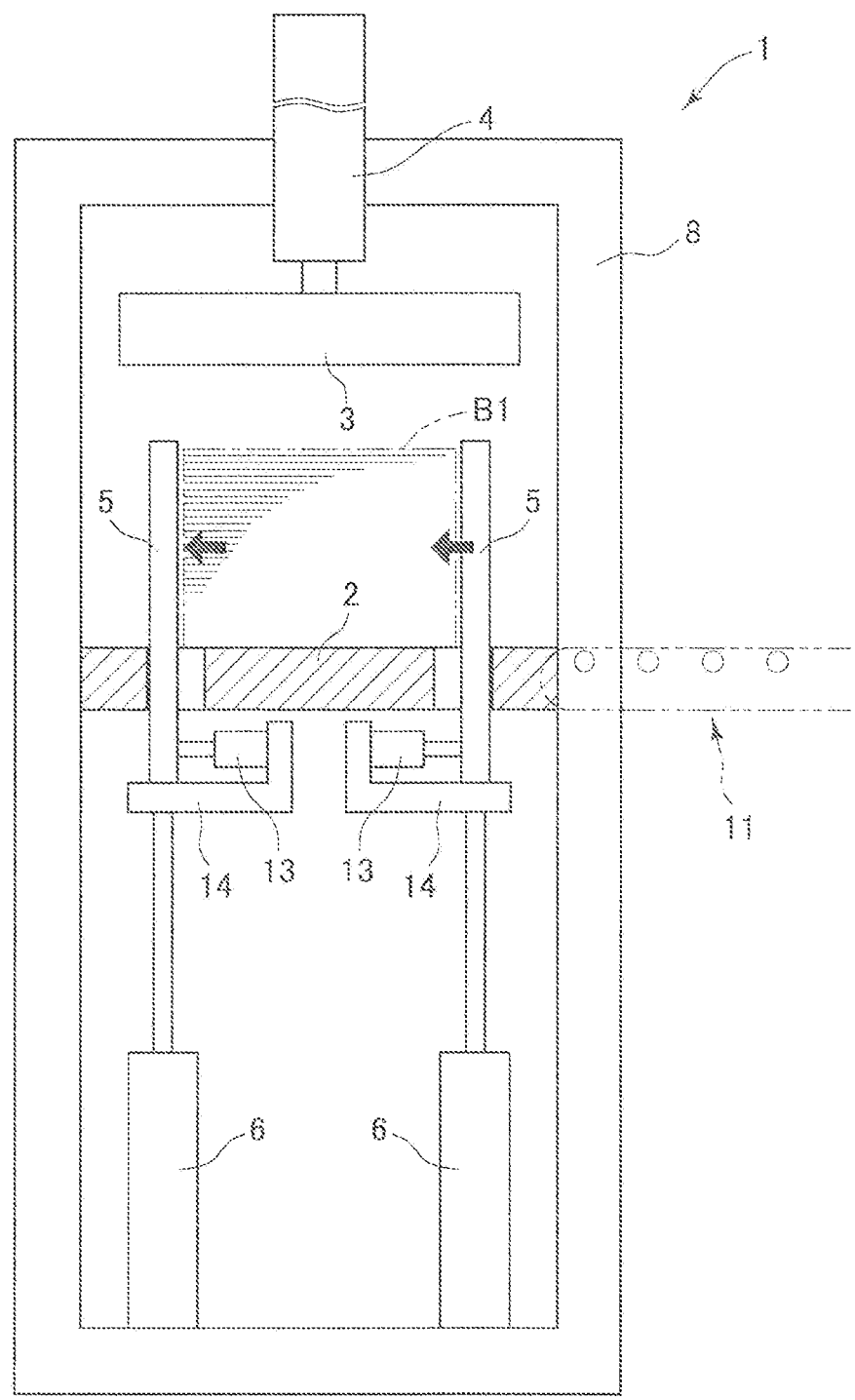
FIG. 5 is a front view, similarly illustrating an operation and a step of the method subsequent to the illustration of FIG. 4.

Then, the regulating member 5 on the side of the transport-in conveyer 11 is laterally moved in a small distance by the lateral movement cylinder 13 toward the regulating member 5 on the opposite side as illustrated in FIG. 5. As a result, the veneer laminate B1 is sandwiched by the pair of regulating members 5 from two sides. The perpendicular wall on one side of the veneer laminate B1 in the direction of fibers is butted to or located in close proximity of an inner surface of the regulating member 5 on the opposite side, while the perpendicular wall on the other side in the direction parallel to fibers is butted to an inner surface of the regulating member 5 laterally moved. After that, the built-in conveyer 20 illustrated in FIG. 1 is moved downward by the lifting and lowering device 23 to a position lower than the support platen 2. Then, the veneer laminate B1 is seated on the upper surface of the support platen 2.

Figure 6:
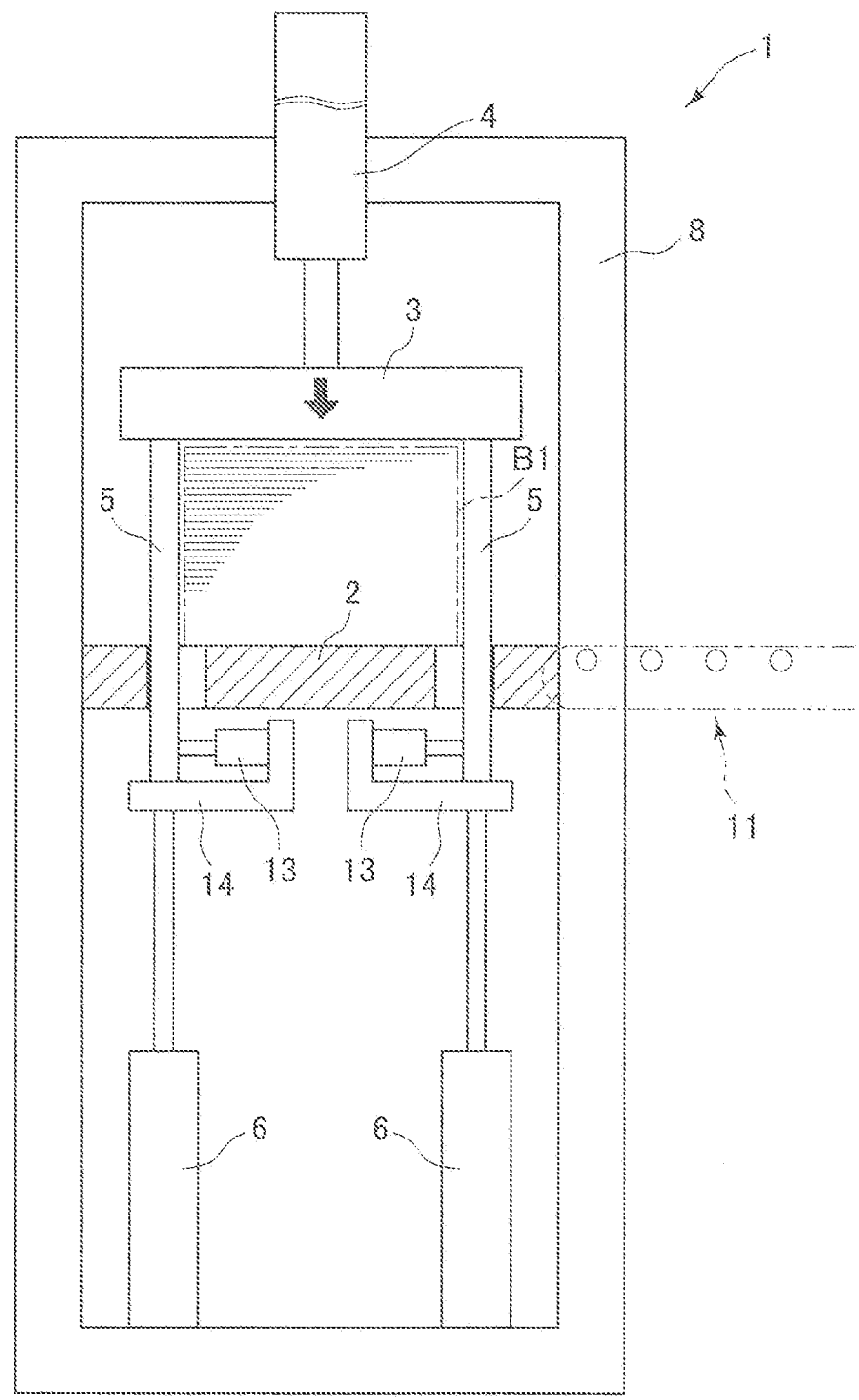
FIG. 6 is a front view, similarly illustrating an operation and a step of the method subsequent to the illustration of FIG. 5.

Then, the pressing cylinder 4 is driven, and the press platen 3 thereby moves downward as illustrated in FIG. 6. During the downward movement, the press platen 3 abuts upper ends of the pair of regulating members 5 protruding upward from the upper face of the veneer laminate B1. A drive pressure of the pressing cylinder 4 is larger than pressures (holding pressures) of the lifting and lowering cylinders 6 of the regulating members 5. After the press platen 3 abuts the upper ends, therefore, the pressing cylinder 4 pushes the pair of regulating members 5 downward while pushing the pistons of the lifting and lowering cylinders 6 downward.

Figure 7:
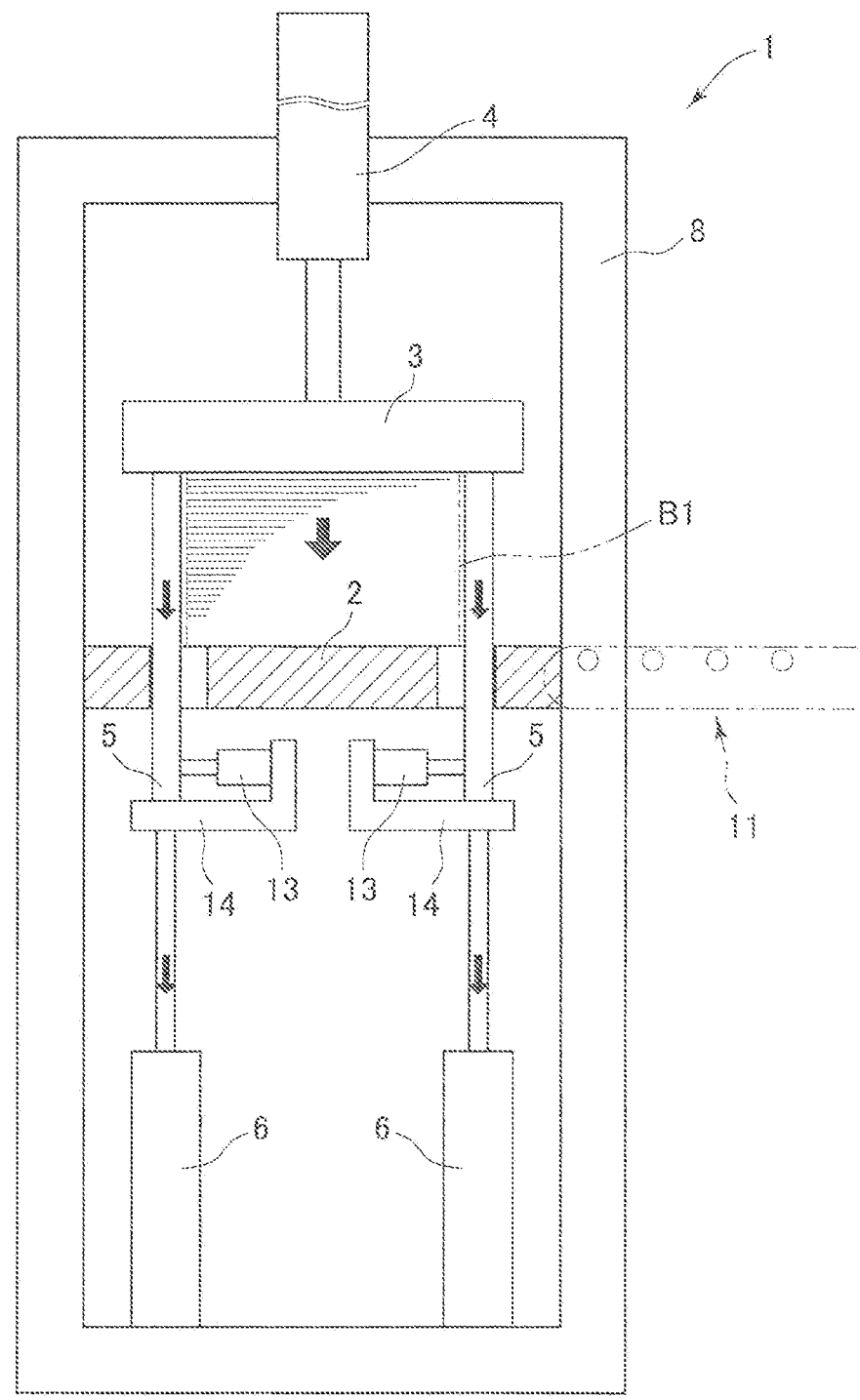
FIG. 7 is a front view, similarly illustrating an operation and a step of the method subsequent to the illustration of FIG. 6.

As illustrated in FIG. 7, as soon as the press platen 3 is butted to the upper face of the veneer laminate B1 (green veneer at the top) during the process, the veneer laminate B1 starts to be compressed by the pressing force applied to the veneer laminate B1. Then, the press platen 3 driven by the pressing cylinder 4 continues to apply the pressing force to the veneer laminate B1 over a predetermined period of time by moving the pair of regulating members 5 downward.

Figure 8:
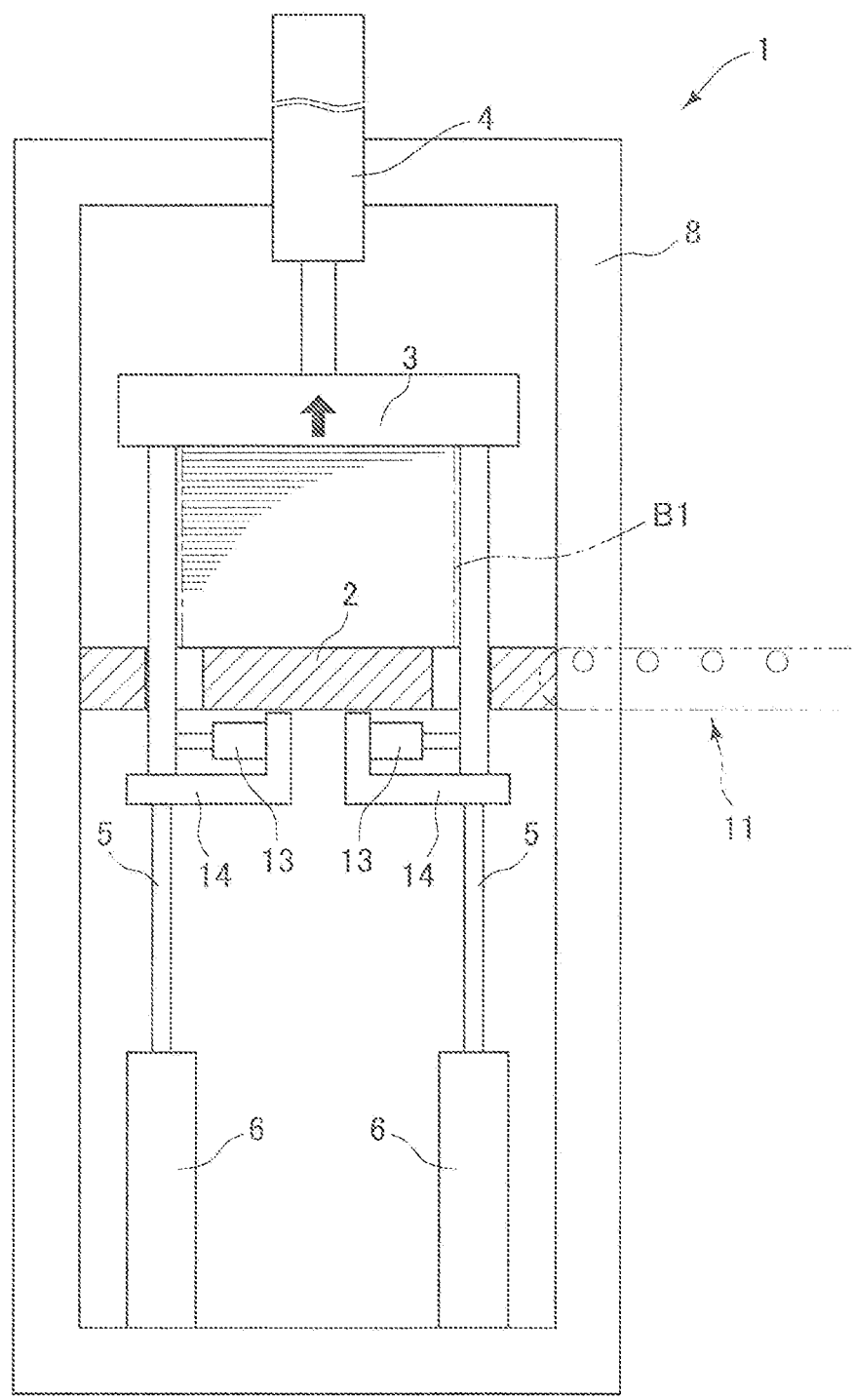
FIG. 8 is a front view, similarly illustrating an operation and a step of the method subsequent to the illustration of FIG. 7.

The veneer laminate B1 is vertically compressed by the pressing force thus applied to the veneer laminate B1 and thereby relatively reduced in height, and the water contained in the respective green veneers is squeezed out through the end faces of the green veneers in the direction of fibers (for example, perpendicular wall on the front illustrated in FIG. 7) and drips downward. During the dewatering treatment, the drive of the pressing cylinder 4 is suspended to release the pressing force (make the pressing force zero) to the veneer laminate B1 from the press platen 3 or weaken the pressing force to a lower level as illustrated in FIG. 8. This is the stop of the first pressing while the water is dripping.

Figure 9:
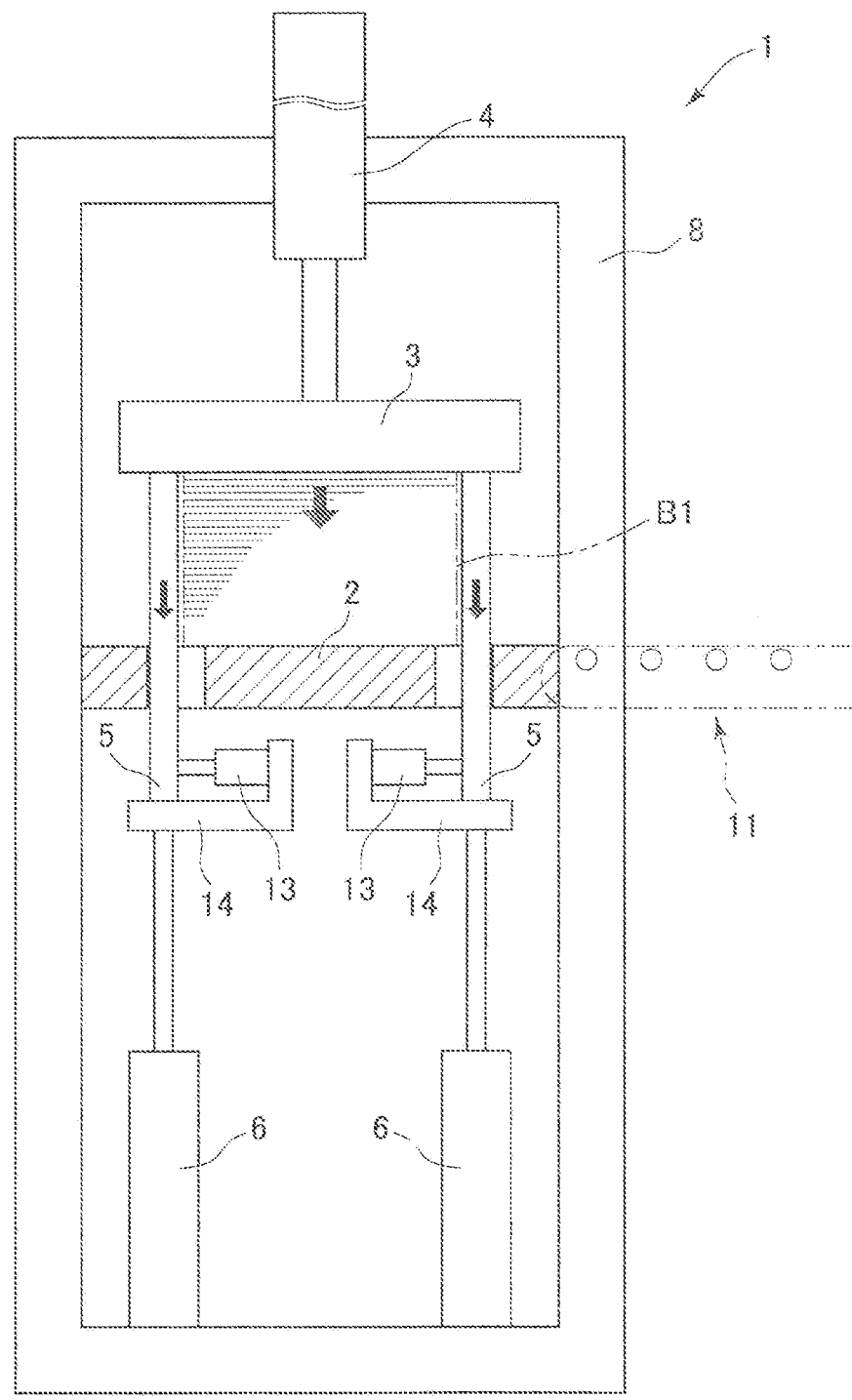
FIG. 9 is a front view, similarly illustrating an operation and a step of the method subsequent to the illustration of FIG. 8.

In a short period of time after the pressing stopped, the pressing cylinder 4 is driven again to proceed to a second pressing where the veneer laminate B1 starts to be pressed again by the press platen 3 as illustrated in FIG. 9.

Figure 10:
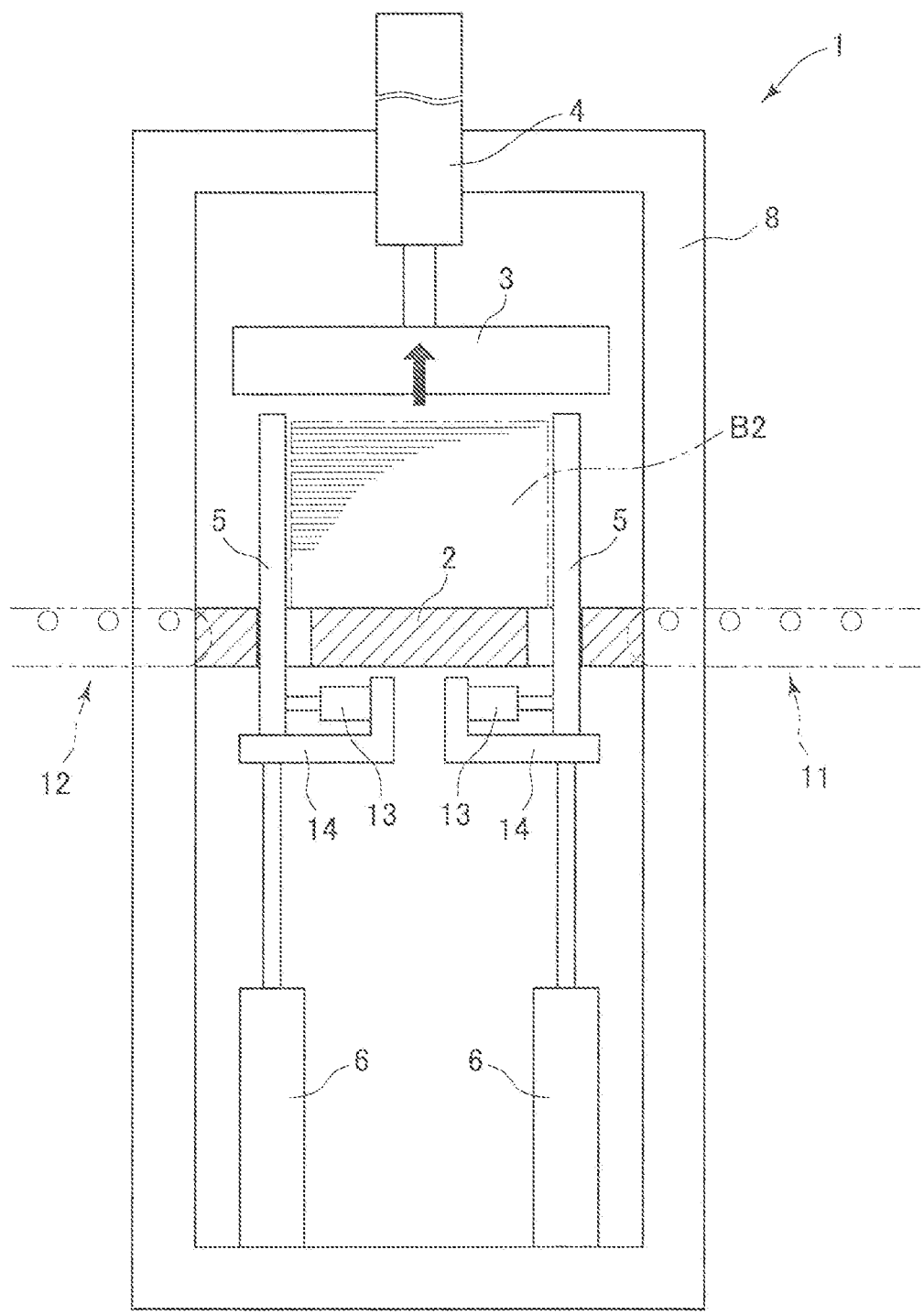
FIG. 10 is a front view, similarly illustrating an operation and a step of the method subsequent to the illustration of FIG. 9.

After the second pressing performed for a predetermined short period of time, it is suitably selected whether the dewatering treatment to the veneer laminate B1 is ended or a third pressing starts after the second pressing stopped, while the water squeezed out of the fibers of the green veneers during the second pressing was dripping. As illustrated in FIG. 10, the pressing cylinder 4 is driven to the backward direction after an Nth pressing (N is an integer equal to or larger than 2) is over, and the press platen 3 starts to move upward and moves away from the upper face of the dewatered veneer laminate B2 and the upper ends of the pair of regulating members 5.

Then, the regulating member 5 at least on the side of the transport-out conveyer 12 is moved downward by the lifting and lowering cylinder 6 until the upper end of the regulating member 5 arrives at the standby position below the upper surface of the support platen 2. The built-in conveyer 20 illustrated in FIG. 1 is moved upward by the lifting and lowering device 23 so that the dewatered veneer laminate B2 is thereby lifted from the support platen 2 and ready to be transported by the built-in conveyer 20. When the conveyer 20 is driven, the veneer laminate B2 moves away from the support platen 2 and continues to be transported by the transport-out conveyer 12 to a predefined site.

The operation of the pressing cylinder in the N-times pressing so far described is controlled by the sequence program 25 run by the pressing controller 7 illustrated in FIG. 1. The timer 26 is a structural element which decides duration time of the respective pressing and the respective pressing-release timing. When the times measured by the timer 26 are equal to duration time of the respective pressing times and pressing-release timing preset in the sequence program, the pressing controller 7 transmits a signal to the electromagnetic valve 29 and, if necessary, the pressing force source 30 to suspend or restart the operation of the pressing cylinder 4. When the pressure of the pressing cylinder 4 obtained from the pressure sensor 28 and the times measured by the timer 6 are used as parameters for deciding timings of continuing and releasing the pressing force, the application of the pressing force is continued or released depending on several conditions described by logical operation such as AND or OR, etc. when the measured pressing force and times are equal to preset values or included in preset numeral ranges.

Figure 11:
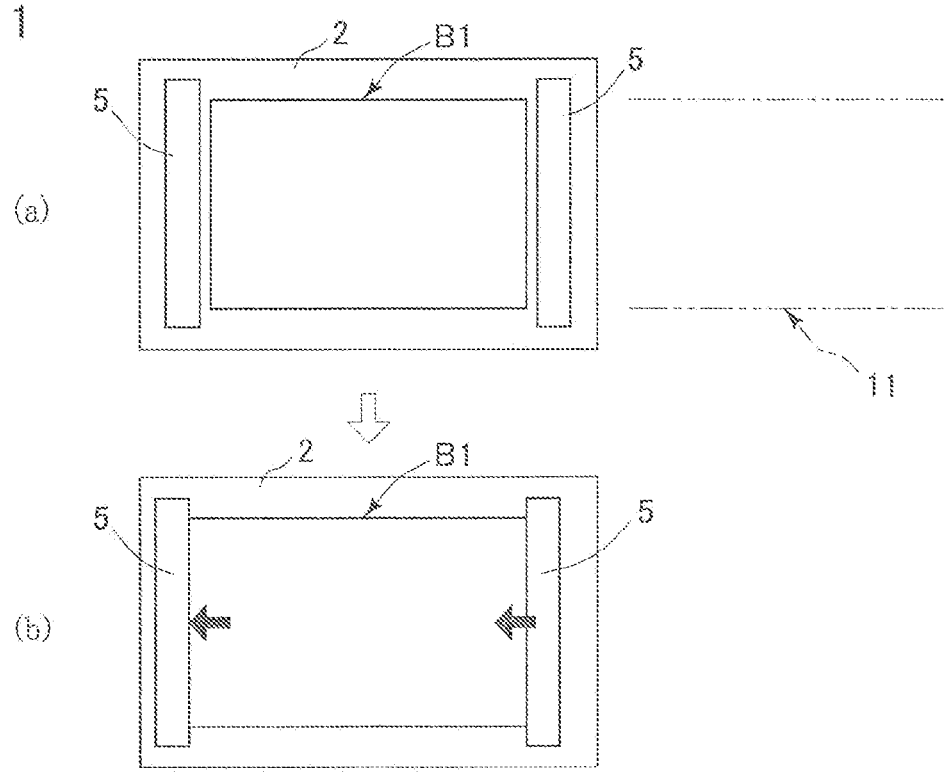
FIG. 11 are plan views, similarly illustrating operations and steps of the method which correspond to the illustrations of FIGS. 4 and 5.
Figure 12:
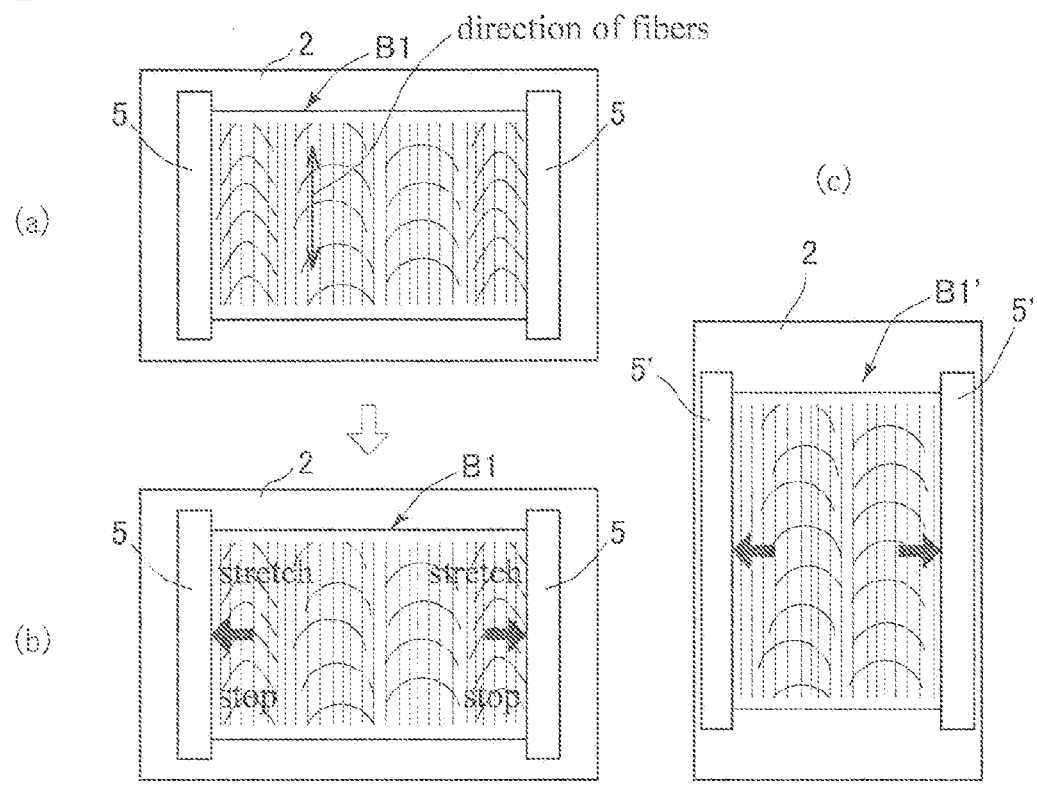
FIG. 12 is a plan view drawn to describe an effect of FIG. 11.

As a result of the lateral movement of one of the regulating members 5 illustrated in FIGS. 4 and 5, the veneer laminate B1 is sandwiched by the regulating members 5 from two sides as illustrated in plan views of FIG. 11. This not only lessens or prevents any tilt or misshaping of the veneer laminate B1 while the pressing force is applied to the veneer laminate B1 but also lessens or prevents any stretch of the end portions of the green veneers in the direction intersecting with the direction of fibers of the green veneers due to the pressing when the veneer laminate B1 is sandwiched from two sides in the fiber-intersecting direction as illustrated in FIG. 12.

Figure 13:
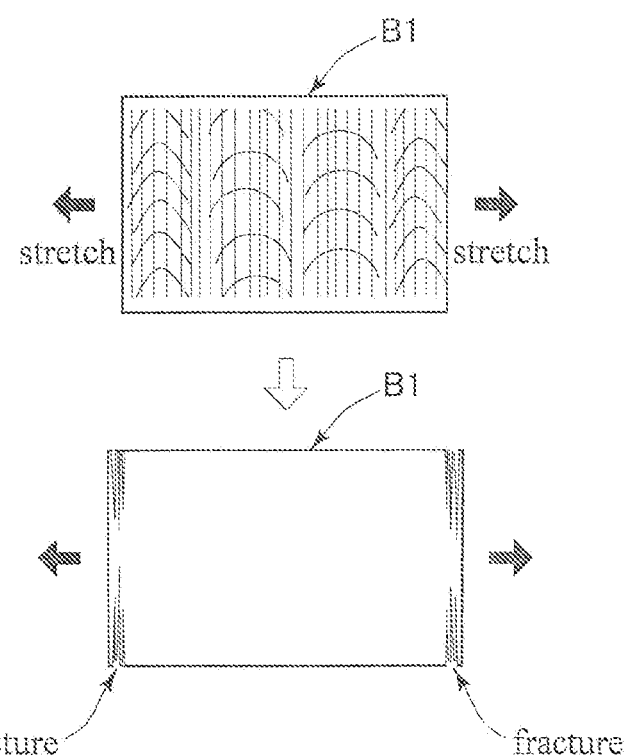
FIG. 13 is another plan view drawn to describe the effect of FIG. 11.
Figure 14:
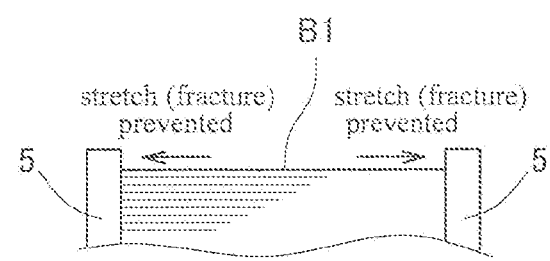
FIG. 14 is a schematic plan view drawn to describe the effect of FIG. 11.

An unlimited stretch of the end portions is likely to cause fractures in the end portions of the green veneers (veneer laminate B1) in the direction of fibers as illustrated in FIG. 13. However, the pair of regulating members 5 can prevent the occurrence of such a stretch and resulting fractures in the end portions, as illustrated in FIG. 14.

Figure 15:
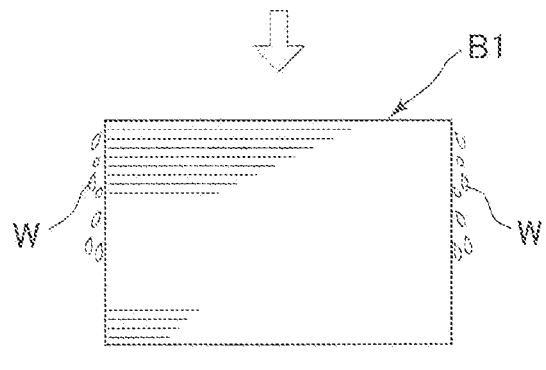
FIG. 15 is a front view of a veneer laminate B1, illustrating a function which corresponds to the illustration of FIG. 7.
Figure 16:
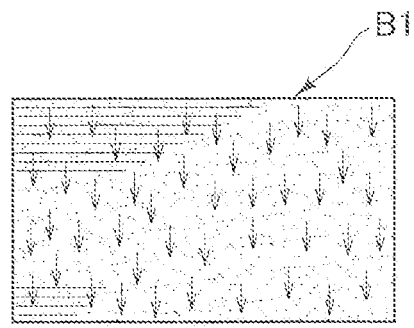
FIG. 16 is a side view of the illustration of FIG. 15.
Figure 17:
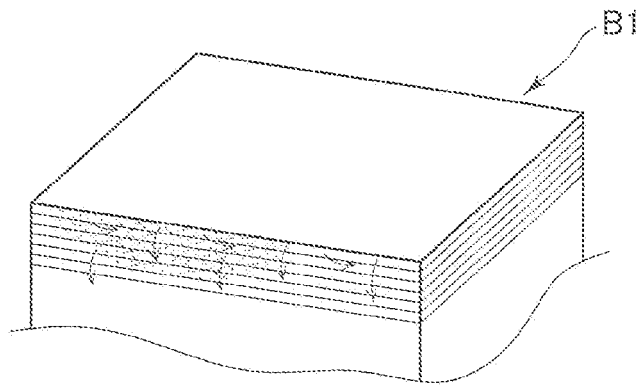
FIG. 17 is a perspective view of the illustration of FIG. 15.
Figure 18:
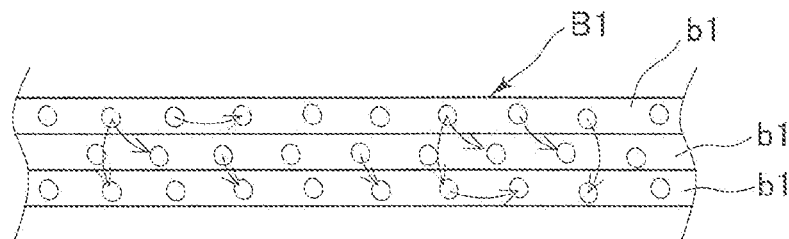
FIG. 18 is a conceptual view drawn to describe water transfer in the veneer laminate B1.

FIGS. 15 to 18 and 21 are conceptual views (images) of situations of the veneer laminate B1 after the first pressing starts and stops as illustrated in FIGS. 7 to 8 and the second pressing thereafter starts as illustrated in FIG. 9. When the veneer laminate B1 is compressed by the pressing force in the first pressing as illustrated in FIGS. 15 and 16, the water is squeezed from the fibers of the green veneers and drips downward along the perpendicular walls of the veneer laminate B1. FIG. 21A conceptually illustrates the veneer laminate before the pressing starts, and FIG. 21B conceptually illustrates the veneer laminate currently being pressed. As illustrated in FIGS. 21A to 21C, when the pressing force is released (or weakened) while the water is dripping, the compressed fibers of the green veneers start to swell trying to regain the original shape, and a negative pressure is thereby generated in the fibers of the green veneers. Under the influence of the negative pressure thus generated, the water dripping along or staying on the wall surfaces of the veneer laminate B1 is suctioned into the fibers of the green veneers. This suctioning under the negative pressure more markedly occurs in the green veneer or any parts of the green veneer relatively containing less water than the green veneer or any parts thereof relatively containing more water.

Accordingly, between the fibers of laminated green veneers b1 and the fibers in different parts of each of the green veneers b1, the water transfer occurs from the green veneer having a high water content to the green veneer having a low water content or from any parts of one green veneer having a high water content to the other parts of the green veneer having a low water content. In other words, a negative pressure pumping action exerted by the green veneers per se when the pressing force is released during the dewatering of the green veneers serves to equalize the water contents in the whole structure of the veneer laminate B1.

Figure 19:
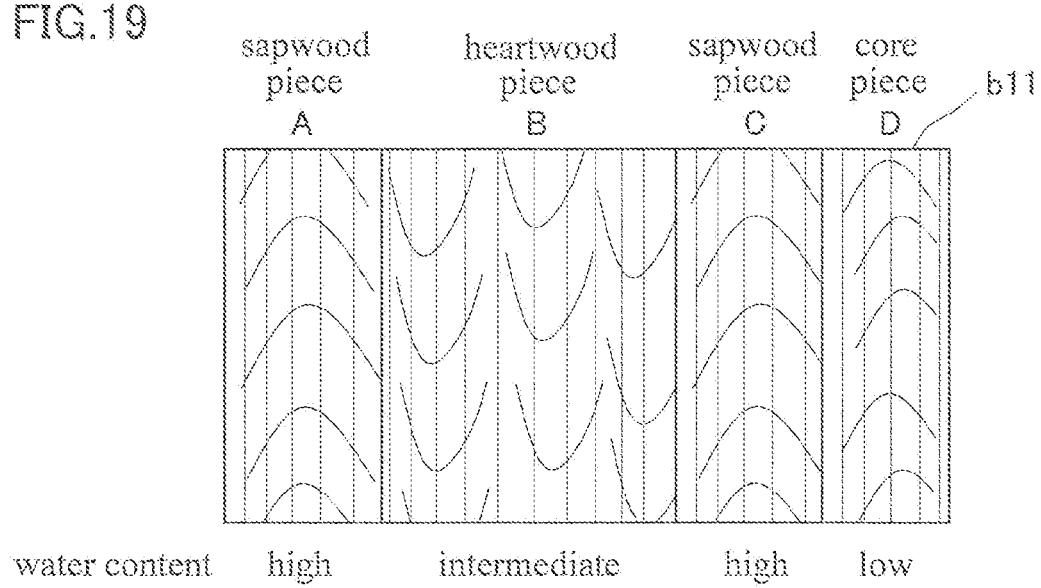
FIG. 19 is a plan view of a patched veneer.
Figure 20A:
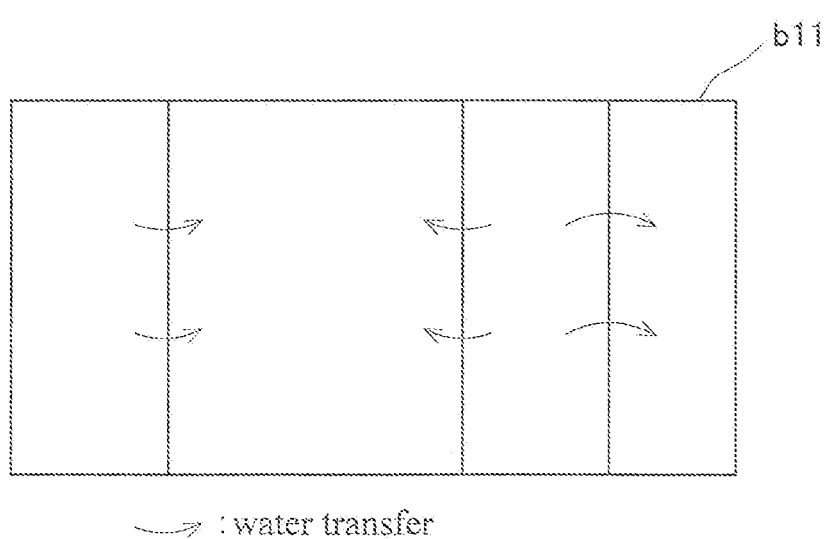
FIG. 20A is a plan view illustrating water transfer in the patched veneer of FIG. 19.
Figure 20B:
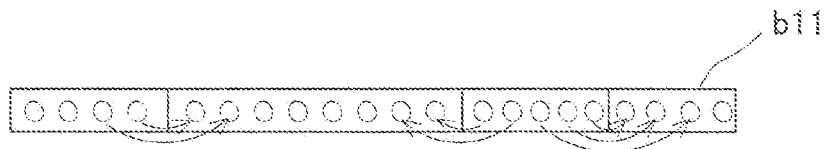
FIG. 20B is a front view of the illustration of FIG. 20A.
Figure 21:
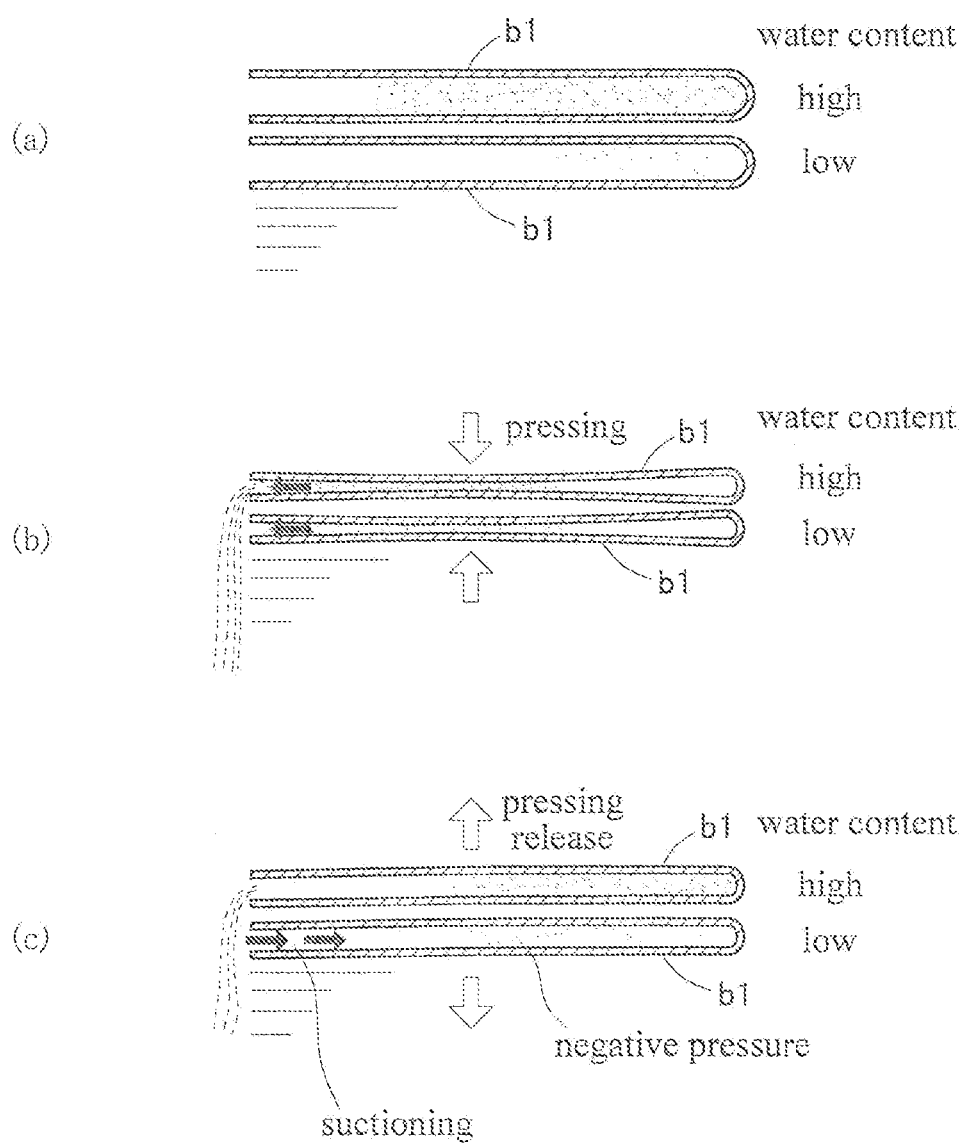
FIG. 21 are conceptual views illustrating water discharge and suctioning mechanisms in green veneers which correspond to the illustrations of FIGS. 6 to 8.

Generally, there may be a relatively small variability of the water contents in one green veneer. To make use of a plurality of different pieces of wood, each one of which is inadequate and unusable as a veneer (inferior pieces of a log with holes or ruptures, or fragments of the pieces generated when the log with cavities, knots, or uneven periphery is cut), they may be joined by means of, for example, a tape, so that a patched veneer is formed and used as a material of plywood similarly to one-piece green veneers normally obtained. In a patched veneer b11 illustrated in FIG. 19, for example, a sapwood piece A (from outer layer) of a cedar tree, a heartwood piece B (from mid layer), a sapwood piece C, and a core piece D (from center) are patched together. There are differences in the water contents of these pieces; twice to three times as different between the sapwood pieces A and C having high water contents and the core piece D having a low water content, and the water content of the heartwood piece B is somewhere between the water contents of these pieces. The negative pressure pumping action, which repeatedly applies the pressing force, release the pressing force, and applies the pressing force again, can more effectively transfer the water particularly between parts of the patched veneer b11 having more different water contents, thereby equalizing the water contents in the patched veneer b11, as illustrated in FIGS. 20A and 20B. This is not a technical advantage limited to the patched veneer. In different parts of a green veneer obtained from a cedar tree, for example, the water content of a part may be larger or smaller by 20% to 150% than the other. Such a large variability is successfully lessened.

The water content equalizing effect thus far described is more enhanced as the release of the pressing force is repeated more often while the green veneers are being pressed and dewatered. Therefore, the pumping action (negative pressure suctioning) is desirably performed a plurality of times such that first pressing, release of first pressing while the water is dripping, second pressing, release of second pressing while the water is dripping, third pressing, release of third pressing while the water is dripping . . . .

To improve a dewatering efficiency by reducing a length of time of the dewatering treatment, it is necessary to coordinate how many times the pressing and pressing release should be repeated and a length of time of the dewatering necessary for one veneer laminate B1. A suggestion for reducing the dewatering time to the minimum is to complete the dewatering treatment for one veneer laminate B1 in three steps; first pressing, release of first pressing, and second pressing.

Figure 22A:
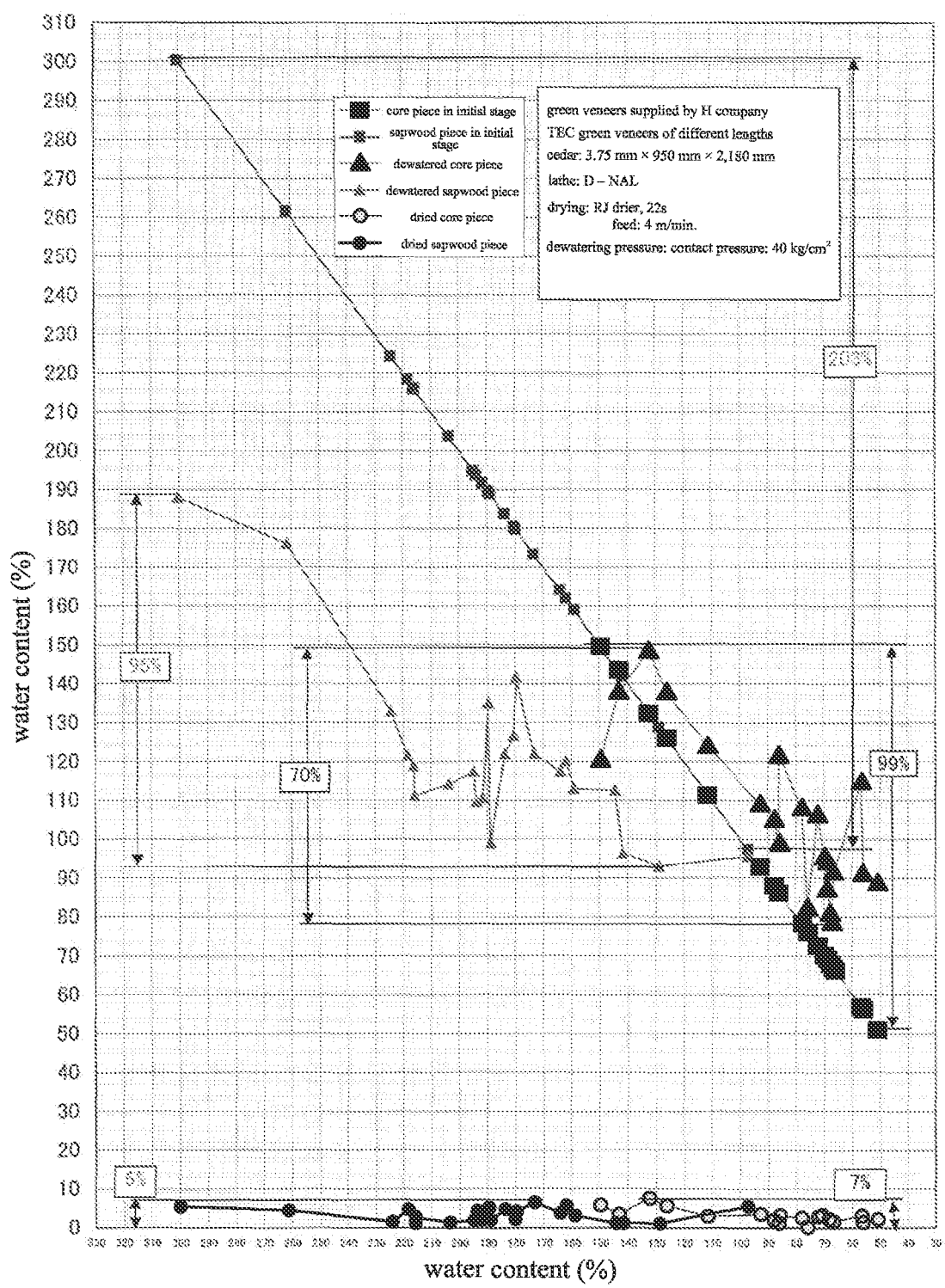
FIG. 22A is a graph which confirms an effect accomplished by the dewatering method according to the invention.

FIG. 22A is a graph illustrating an effect of the dewatering treatment in the veneer laminate B1 described so far (particularly, effect of equalizing post-dewatering water contents). In a dewatering test performed according to the method described so far, water contents of the sapwood pieces were about 100% to 300% at most with such a large difference of 203% in an initial stage (before the dewatering treatment). However, the variability of the water contents was reduced to 95% after the dewatering treatment according to the invention. The variability was further reduced to 5% after the drying treatment subsequent to the dewatering treatment.

The cedar core showed the water contents of about 50% to 150% at most with the water content difference of 99% in the initial stage (before the dewatering treatment). The water content difference was reduced to 70% after the dewatering treatment and further reduced to 7% after the drying treatment.

As illustrated in an upper part of FIG. 22B, 1) illustrates the water content uniformity when a cycle of pressing→release→pressing was repeated three to five times. The water content uniformity was checked in combinations of the dewatering pressures of 10, 15, 20, 30, 40, 50, and 60 kg/cm$^2$ and the release pressures of 0, 5 and 10 kg/cm$^2$. A result thereby obtained was; the water content uniformity was not very good at the dewatering pressure of 10 kg/cm$^2$ (for example, water content variability of around 20% after drying), the water content uniformity was good at the dewatering pressure of 15 kg/cm$^2$ (for example, water content variability of at most 15%), the water content uniformity was good or very good at the dewatering pressure of 20 to 50 kg/cm$^2$ (for example, water content variability of less than 10%), and the water content uniformity was better at the release pressure of 0 or 5 kg/cm$^2$ than 10 kg/cm$^2$. At the dewatering pressure of 60 kg/cm$^2$, the water content uniformity was good after drying, however, fractures were generated in a part of the green veneers.

As illustrated in a lower part of FIG. 22B, 2) illustrates the water content uniformity when a cycle of pressing→release→pressing was performed once or repeated twice. The water content uniformity was good after drying except for the dewatering pressure of 10 kg/cm², however, the water content variability was smaller when the cycle was repeated at least three times.

Next, another example of the invention is described referring to an apparatus illustrated in FIGS. 23 to 29.

Figure 23:
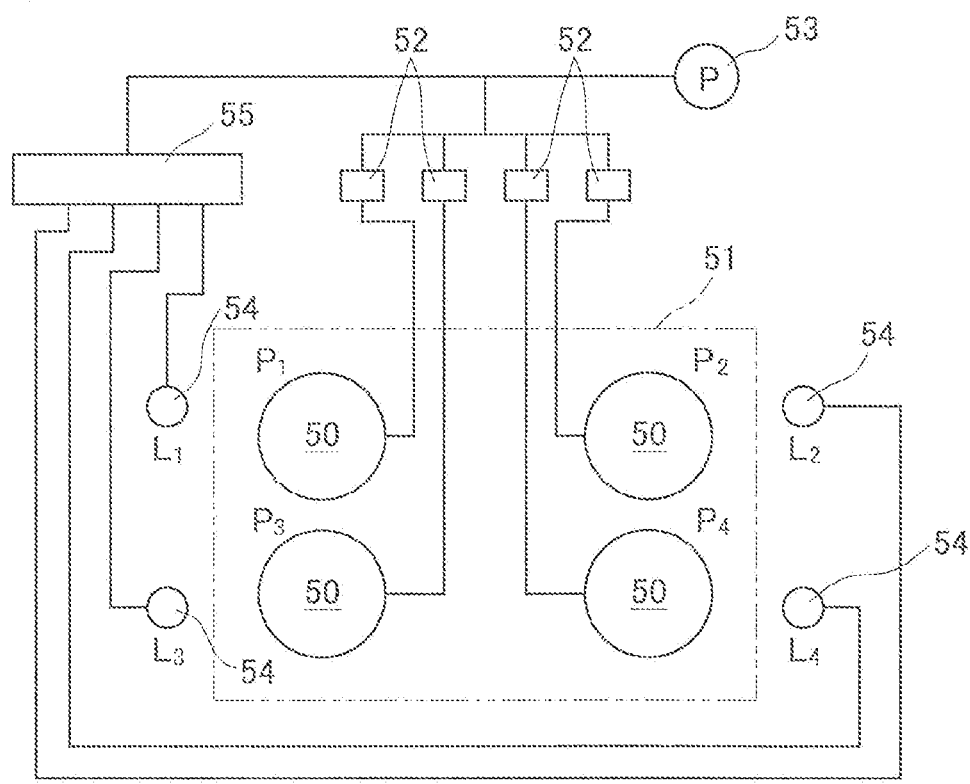
FIG. 23 is a drawing of an oil pressure system, illustrating another apparatus suitably used in the dewatering method according to the invention.
Figure 24:
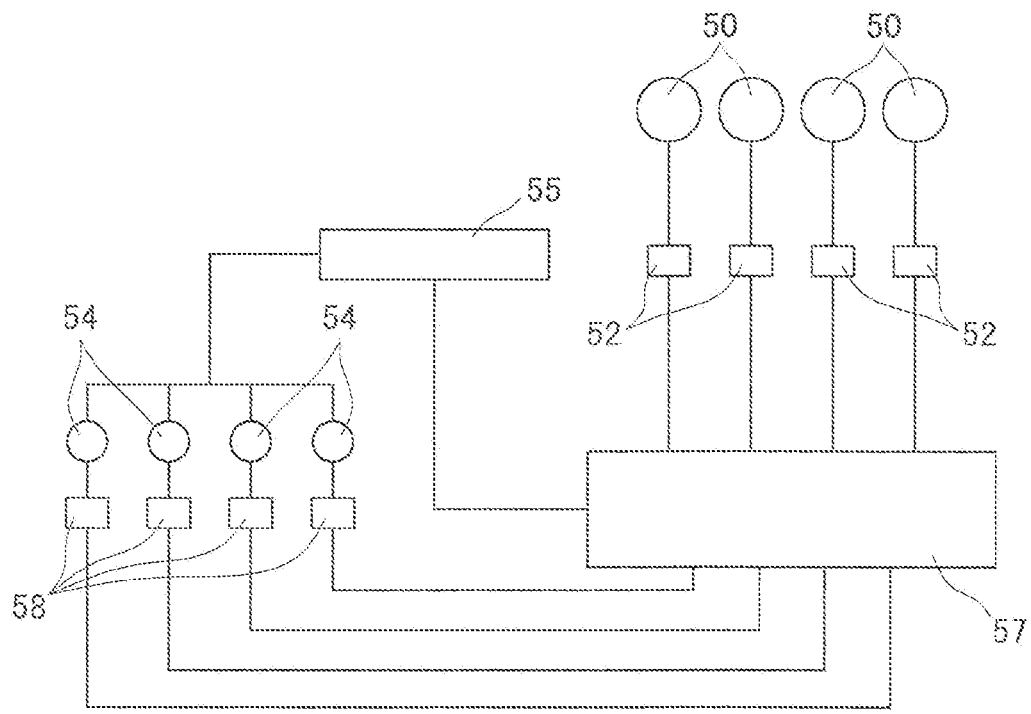
FIG. 24 is a drawing of a control system in the illustration of FIG. 23.

As is clear from an oil pressure system illustrated in FIG. 23, the apparatus used in the example includes a plurality of (four in this example) pressing cylinders 50 which pressurize the veneer laminate B1 from an upper direction. The pressing cylinders 50 are coupled with a press platen 51 which is an example of the pressing member, and the pressing cylinders 50 are connected to an oil pressure source 53 (compressor or oil pressure pump) through electromagnetic valves 52 of the pressing cylinders 50. A plurality of (for example, two each on two sides of the press platen 51, four in total) lifting cylinders 54 is coupled with the press platen 51 in parallel with the pressing cylinders 50 to be located on outer sides of the pressing cylinders 50. The lifting cylinders 54 are all connected to the oil pressure source 53 through a common electromagnetic valve 55. As illustrated in FIG. 24, each of the electromagnetic valves 55 of the plurality of pressing cylinders 50 is connected to a controller (oil pressure controller) 57, and the electromagnetic valve 55 of the plurality of lifting cylinders 54 is also connected to the controller 57.

Figure 25:
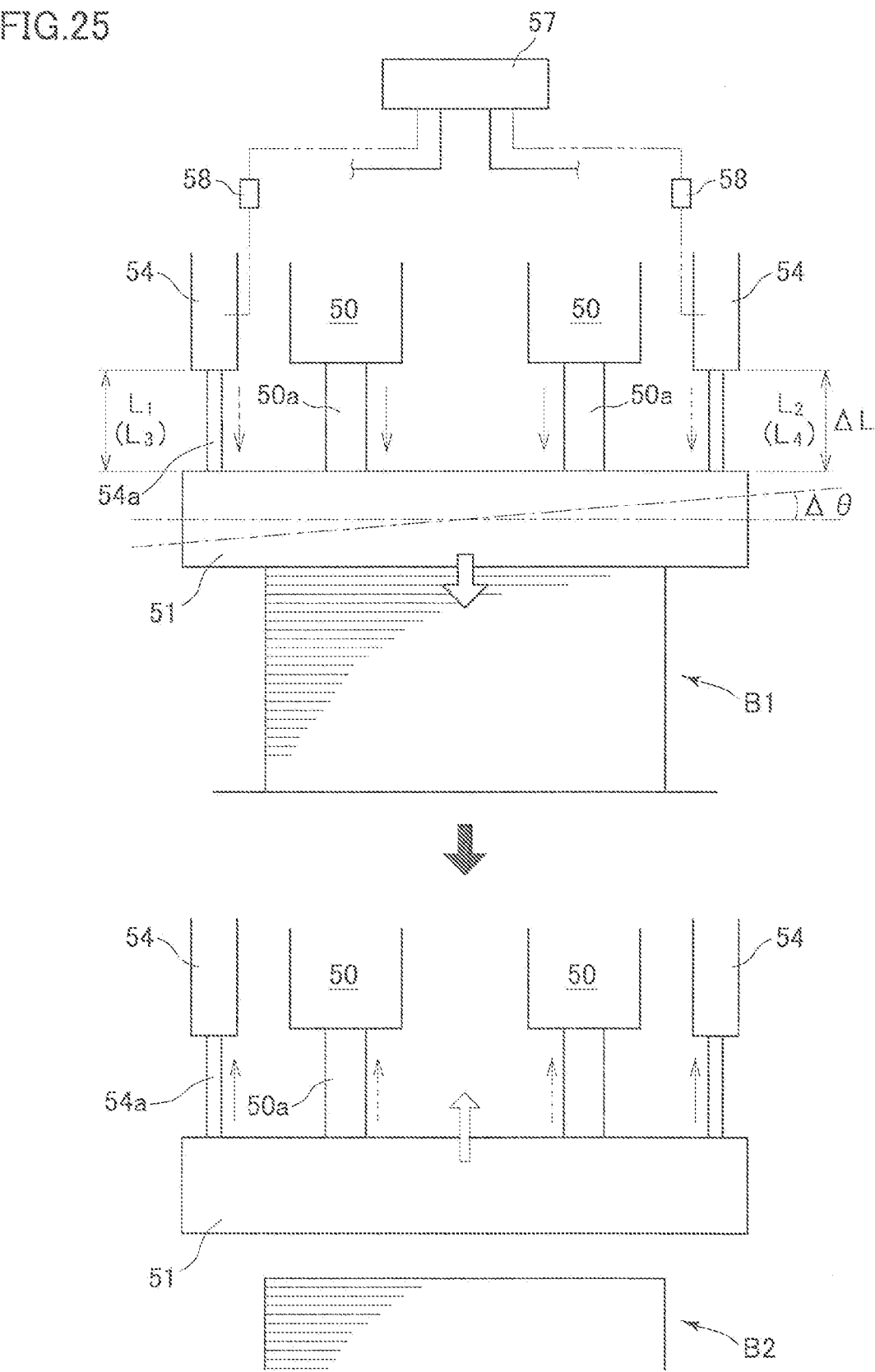
FIG. 25 is a schematic front view of the apparatus, illustrating an operation including lifting cylinders.

As illustrated in FIG. 25, the lifting cylinders 54 each has a linear encoder 58 incorporated in the lifting cylinders 54 or attached to the lifting cylinders 54 as a measuring device which measures a stroke (operation) distance (stretch distance of piston rods 54a). The encoders 58 are connected to the controller 57. When the pressing cylinders 50 are stretched to press the veneer laminate B1 by the use of the press platen 51, the piston rods 54a of the four lifting cylinders 54 are stretched as the press platen 51 is moving downward. During the stretch, the linear encoders 58 measure stroke distances (stretch distances of the piston rods 54a) L1, L2, L3, and L4 of the lifting cylinders 54 and outputs measured values of the distances to the controller 57.

Depending on a difference between the output values of the encoders 58 (deviation ΔL) or a three-dimensional tilt Δθ of the press platen 51 calculated from the output value deviation ΔL, the controller 57 controls the electromagnetic valves 52 of the pressing cylinders 50 (FIGS. 23 and 24) so that the deviation ΔL or the tilt Δθ are reduced to the minimum. Further, the controller 57 separately controls working pressures P1 to P4 of the pressing cylinders. As a result, the tilt of the press platen 51 relative to the veneer laminate B1 is corrected. The piston rods 54a of the lifting cylinders 54 illustrated in FIG. 25, therefore, are coupled rotatably (through a small degree) relative to the press platen 51. The piston rods 50a of the pressing cylinders 50 may be configured to abut the press platen 51 by means of, for example, hooks not illustrated in the drawings.

When the press platen 51 is lifted to a lift-up position after the veneer laminate B1 is pressed and dewatered by the pressing cylinders 50, the pressing cylinders 50 are not driven but the lifting cylinders 54 alone are driven (a fluid pressure is supplied from the pressure source 53 through the electromagnetic valve 55) to elevate the press platen 51 to the lift-up position (original position). At the time, the piston rods 50a of the plurality of pressing cylinders 50 shrink following the actions of the lifting cylinders 54. A force for simply lifting the press platen 51 is obtained from the application of a cylinder pressure large enough to overcome the weight of the press platen 51. If such a cylinder pressure is applied by the pressing cylinders 50 with large outputs, a very large pressure is needed to drive the heavy pistons. However, as far as the small-sized lifting cylinders 54 with low outputs are used to apply such a cylinder pressure, the press platen 51 can be lifted and returned to the original position by a small cylinder pressure and a low energy.

The lifting cylinders 54 are stretched in response to the actions of the pressing cylinders 50 (downward movement of the press platen 51), and the strokes are plotted by the encoders 58. Then, the pressing cylinders 50 are separately controlled based on the deviation ΔL or the tilt Δθ used as a parameter. Accordingly, the lifting cylinders 54 may be used without additionally providing a specific mechanism to correct the tilt of the press platen 51 during the application of the pressing force. Further, the veneer laminate B1 can be equalized in height and thereby evenly dewatered.

Figure 26:
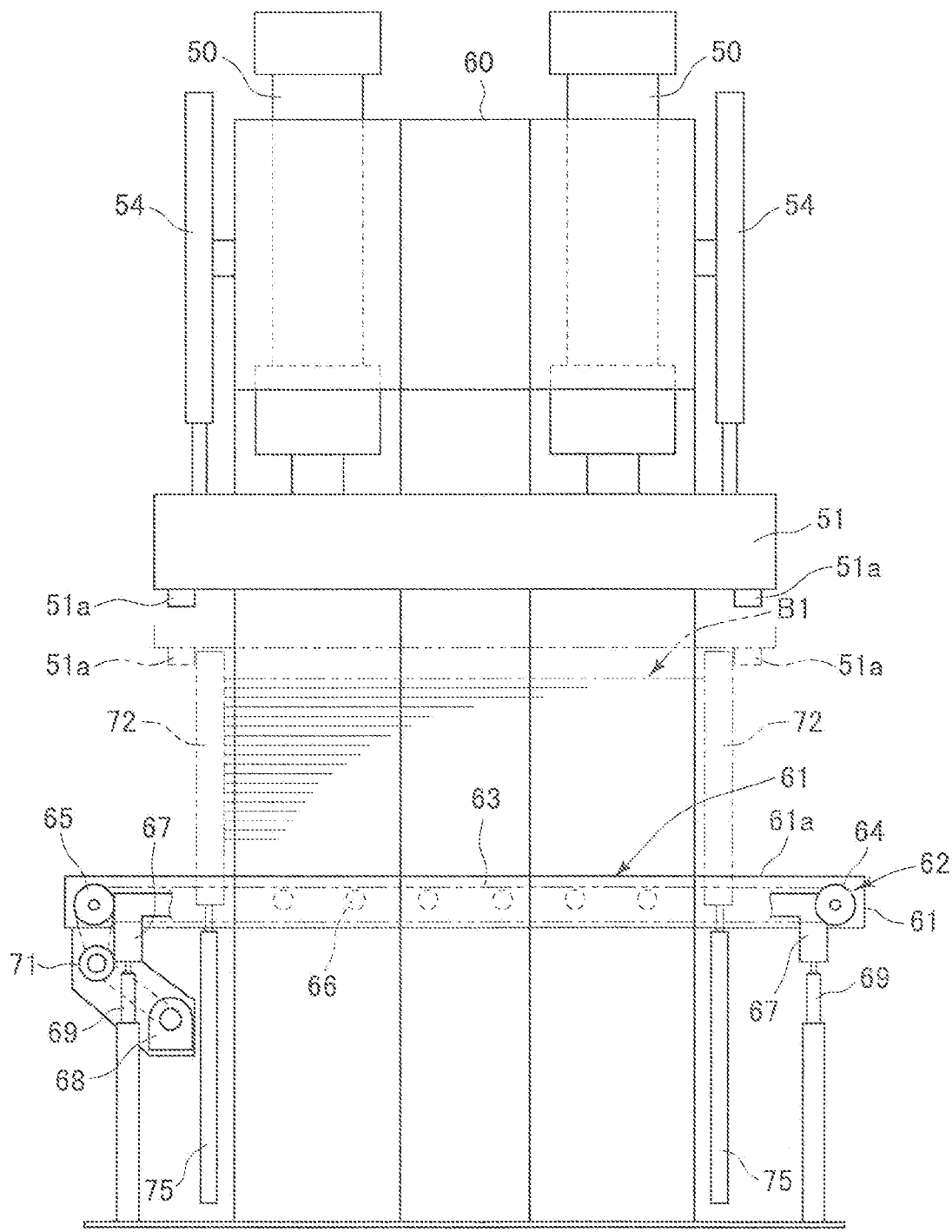
FIG. 26 is a front view, more specifically illustrating the apparatus of FIG. 25.
Figure 27:
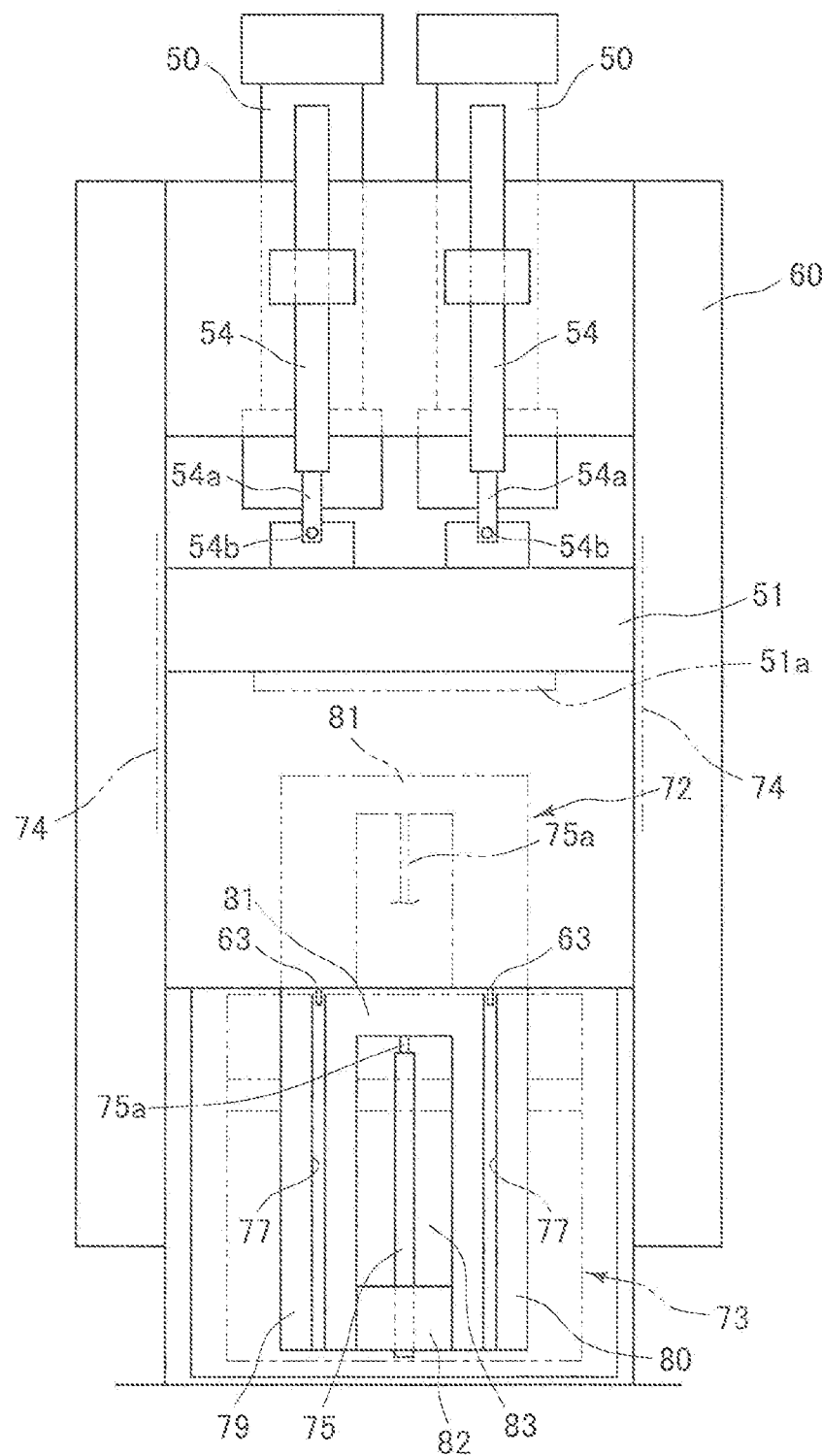
FIG. 27 is a side view of the illustration of FIG. 26.

FIGS. 26 and 27 specifically illustrate a positional relationship between the pressing cylinders 50 and the lifting cylinders 54. The pressing cylinders 50 are secured to inside of a frame 60 which is a securing member of the apparatus, and the lifting cylinders 54 is secured to an outer side of the frame 60. Referring to FIG. 27, the piston rods 54a of the lifting cylinders 54 are coupled with the press platen 51 by pins 54b (for example, rotatable two-dimensionally or three-dimensionally on at least one of shafts X and Y).

As illustrated in FIG. 26, an upper surface of a support platen 61 is used as a support surface 61a supporting the veneer laminate B1 placed on the upper surface of a support platen 61. A chain conveyer (built-in conveyer) 62 is provided in parallel with the support surface 61a. The conveyer 62 has endless raceways 63 in two rows provided such that they are hidden immediately below the support surface 61a (for example, chains), cyclic sprockets 64 and 65 which support the chains 63 so that these chains cyclically go around, a plurality of support sprockets 66 subject to loads acting on the chains 63, a conveyer frame 67 which supports the sprockets 64 to 66, a motor 68 supported by the frame 67 which drives the chains 63, and a conveyer lifting and lowering cylinder 69 which lifts and lowers the whole structural elements by the use of the frame 67.

Figure 28:
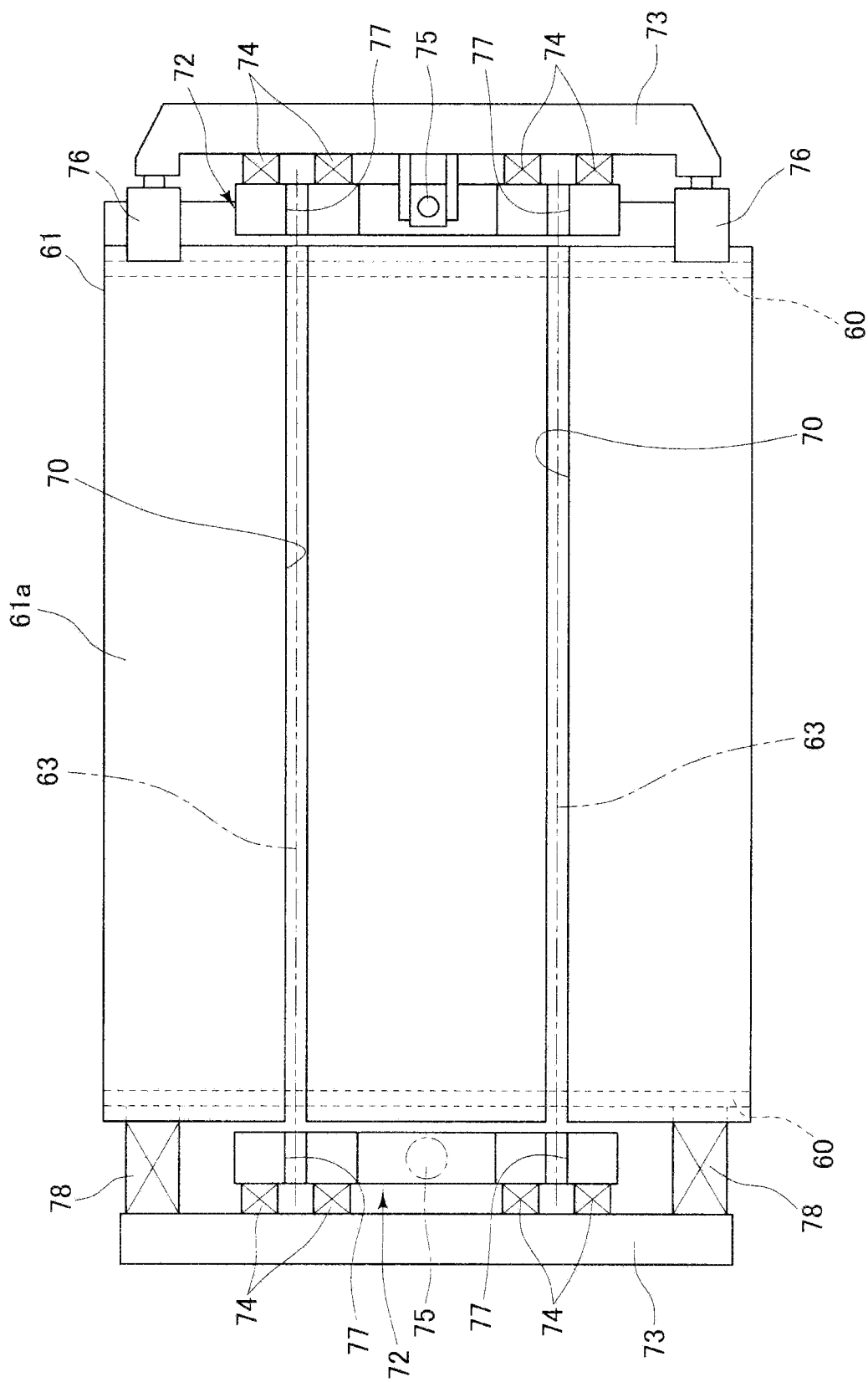
FIG. 28 is a plan view of a lower part in the illustration of FIG. 26.

As illustrated in FIG. 28, the upper surface of the support platen 61 (support surface 61a) has chain grooves (slits) 70 for the chains 63 to travel through. The chains 63 in two rows are lifted and lowered in the chain grooves 70 by the conveyer lifting and lowering cylinder 69 to and from a transport position slightly higher than the upper surface of the support platen 61 and a standby position lower than the upper surface. While the veneer laminate B1 is being pressurized, the chains 63 are at the standby position. When the veneer laminate B1 is transported to and from the support platen 61, the chains 63 are lifted by the conveyer lifting and lowering cylinder 69 to the transport position. A drive shaft (sprocket) 71 illustrated in FIG. 26 is provided to make the chains 63 in two rows go around in synchronization with each other. The rotation of the motor 68 is transmitted to the sprockets 65 and 71 through a driving mechanism such as a chain, and the chains 63 are thereby synchronously driven.

Figure 29:
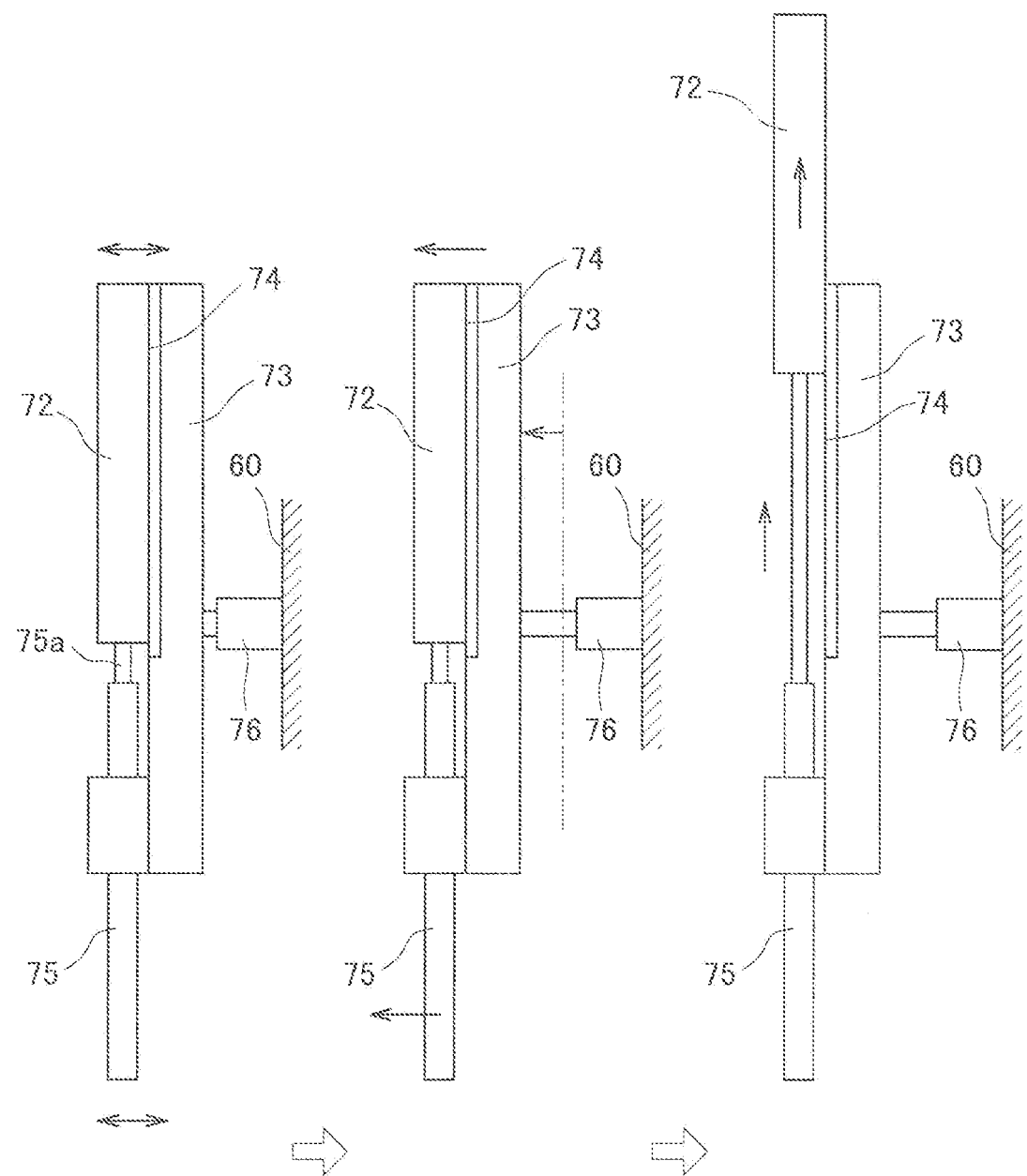
FIG. 29 is a schematic illustration of operations of a lateral movement device and a regulating member illustrated in FIGS. 26 to 28.

In the illustration of FIG. 26, regulating members 72 which regulate positions of two opposite sides (two faces) of the veneer laminate B1 are supported relative to lateral movement members 73 standing upright so that the regulating members 72 can be vertically lifted and lowered by the use of lifting and lowering guides 74 as schematically illustrated in FIG. 29. Lifting and lowering cylinders 75 which lift the regulating members 72 are secured to the lateral movement members 73, and piston rods 75a of the lifting and lowering cylinders 75 are coupled with the regulating members 72. The lateral movement members 73 are supported in the frame 60 of the apparatus by the lateral movement cylinders (lateral movement devices) 76. When the lateral movement cylinders 76 are put in action, the regulating members 72, the lateral movement devices 73, and the lifting and lowering cylinders 75 are all laterally (horizontally) move at once in a given range of distances.

When the lifting and lowering cylinders 75 are operating (stretching), the regulating members 72 move upward under the guidance by the lifting and lowering guides 74 of the lateral movement members 73. As illustrated in FIG. 26, the two regulating members 72 facing each other regulate the positions of opposite two end faces of the veneer laminate B1. As illustrated in FIG. 29, the regulating members 72 are moved horizontally by the lateral movement cylinders 76 by the use of lateral movement members 73, and the veneer laminate B1 staying afloat which is supported by the chain conveyer 62 is sandwiched by the regulating members 72.

FIG. 28 is a plan view specifically illustrating the structure schematically illustrated in FIG. 29. On right and left sides of the drawing are illustrated the structural elements at vertically different positions, however, the apparatus in practical use is basically laterally symmetrical. The chains 63 of the chain conveyer 62 are located in the tracks of the regulating members 72 moving upward and downwardly. Therefore, the regulating members 72 are respectively provided with relief grooves (slits) 77 to avoid any interference with the chains 63. The relief grooves 77 are vertically formed in an enough length to meet the strokes of the regulating members 72 moving upward and downward. The lateral movement cylinders 76 are secured to the frame 60 at positions in front and back of a depth direction of the support plate 61 so as to extrude the lateral movement cylinders 76 from the frame 60 of the apparatus to the outside at the side of the apparatus, and the lateral movement members 73 standing upright are coupled with the cylinders 76.

The regulating members 72 are located on inner sides of the lateral movement members 73, in other words, respectively between the lateral movement members 73 and the frame 60. The regulating members 72 are supported by the lateral movement members 73 by the use of the lifting and lowering guides 74 so as to move upward and downward and moved to right and left in the illustration of FIG. 28 by the lateral movement cylinders 76. Though not illustrated in FIG. 28, the lateral movement cylinder 76 is provided on the left of the drawing similarly to the lateral movement cylinder 76 on the right, and functions similarly thereto. On the left of the drawing is illustrated a lateral movement guide 78, which functions as a linear guide which couples the lateral movement member 73 with the frame 60 at a position different in height to the lateral movement cylinder 76 at positions in front and back of a depth direction of the support plate 61 to guide the lateral movement member 73 to right and left in the drawing. Though not illustrated in FIG. 28, a lateral movement linear guide is similarly provided on the right of the drawing to guide the lateral movement member 73 on the right to horizontally move.

As illustrated in FIG. 27, the regulating members 72 have longitudinal frame portions 79 and 80 which are rectangular pipe materials each formed in a frame shape, lateral frame portions 81 and 82 which vertically connect the longitudinal frame portions, inner spaces of the frame portions 79 to 82, and plate members 83 which seal the spaces. The relief grooves (slits) 77 in the up-down direction are respectively formed in the longitudinal frame portions 79 and 80 so as to fit the chains 63 in two rows. The piston rods 75a of the lifting and lowering cylinders 75 secured to the lateral movement members 73 are coupled with a lower surface of the lateral frame portion 81 on the upper side.

As illustrated in FIG. 27, the up and down movement of the press platen 51 is guided by the lifting and lowering guide 74 formed in the frame 60. A pair of upper stoppers 51a (stopper portions) are formed on a lower surface of the press platen 51 with an interval therebetween equal to the outer-side intervals of the pair of regulating members 72 (for example, long enough to meet a width dimension of the regulating member 72 as illustrated in FIG. 27). When the press platen 51 moving downward make contact with the upper ends of the pair of regulating members 72, the pair of upper stoppers 51a are in close proximity of the outer surfaces of the regulating members 72, thereby preventing the pair of regulating members 72 from opening outward during the application of the pressing force.

Describing the basic operation in the example described so far, similarly to the example illustrated referring to FIGS. 1 to 21, after the veneer laminate B1 is transported onto the support platen 61 by the chain conveyer 62 driven by the motor 68 while the regulating member 72 on the left in FIG. 26 protrudes from the support platen 61 and the regulating member 72 on the right is receded from the support platen 61, the regulating member 72 on the right in FIG. 26 then protrudes from the support platen 61. When the regulating member 72 thus protruding is laterally moved by the lateral movement cylinder 76 toward the regulating member 72 on the left, the veneer laminate B1 is sandwiched by these regulating members 72, and the conveyer lifting and lowering cylinder 69 moves the chain conveyer 62 downward. Then, the veneer laminate B1 is placed on the upper surface (support surface) 61a of the support platen 61.

Then, the pressing cylinders 50 are driven, and the press platen 51 accordingly moves downward and abuts the upper ends of the pair of regulating members 72. Then, the press platen 51 driven by the pressing cylinders 50 compresses the veneer laminate B1 by pushing the regulating members 72 downward to squeeze the water contained in the veneer laminate B1. During the process, the stroke distances L1 to L4 of the plurality of lifting cylinders 54 that follow the pressing cylinders are plotted, and the plurality of pressing cylinders 50 is separately controlled so that the press platen 51 is not tilted, in other word, the veneer laminate B1 is horizontally retained equally in height.

When the pressing force applied by the pressing cylinders 50 is released or weakened, the compressed fibers of the green veneers start to swell, and a negative pressure is thereby generated in the fibers of the green veneers. Under the influence of the negative pressure thus generated, the water dripping along the perpendicular walls of the veneer laminate B1 is suctioned into the green veneer or any parts of the green veneer relatively containing less water. As a result, the water contents are more efficiently equalized in the green veneers and the whole structure of the veneer laminate B1. Further, the regulating members 72 regulate any stretch of the end portions of the green veneers in the direction intersecting with the direction of fibers, thereby reducing a likelihood of any fractures in the end portions.

When the dewatering treatment for equalizing the water contents is completed after the pressing and the pressing release (or the pressing force is reduced) are performed by the pressing cylinder 50 a suitable number of times (for example, once to three times), the regulating members 72 illustrated in FIG. 26 are both moved downward to a lift-down position by the lifting and lowing cylinders 75. Then, the chain conveyer 62 is elevated by the conveyer lifting and lowering cylinder 69 to lift the dewatered veneer laminate B2 from the support surface 61a of the support platen 61. The chain conveyer 62 driven by the motor 68 transports the veneer laminate B2 from the support platen 61. Then, the same steps are performed for the next veneer laminate B1.

The example described so far succeeded in reducing the variability of the water contents as illustrated in FIG. 22.

Figure 30:
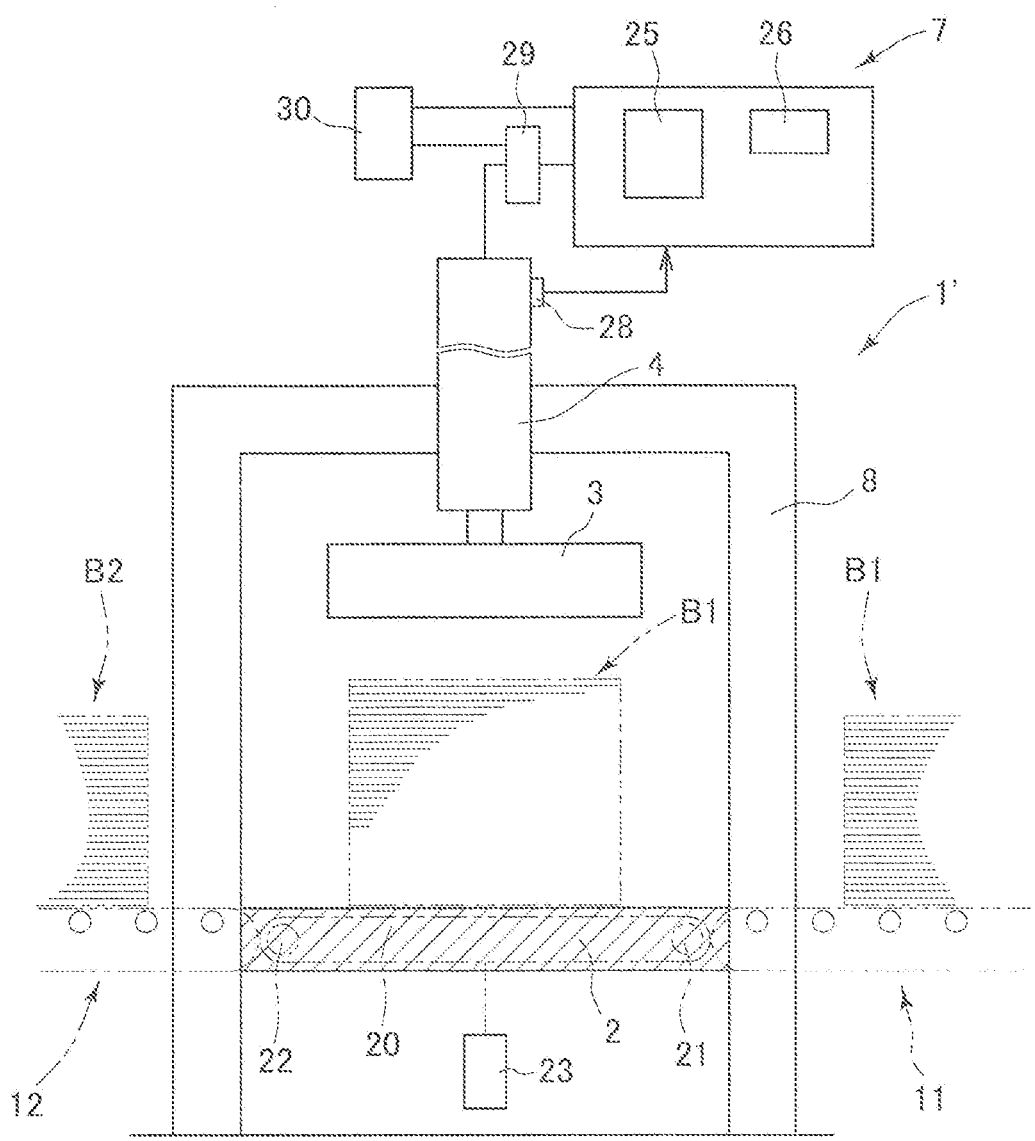
FIG. 30 is a front view which corresponds to FIG. 1, illustrating still another apparatus suitably used in the dewatering method according to the invention.
Figure 31:
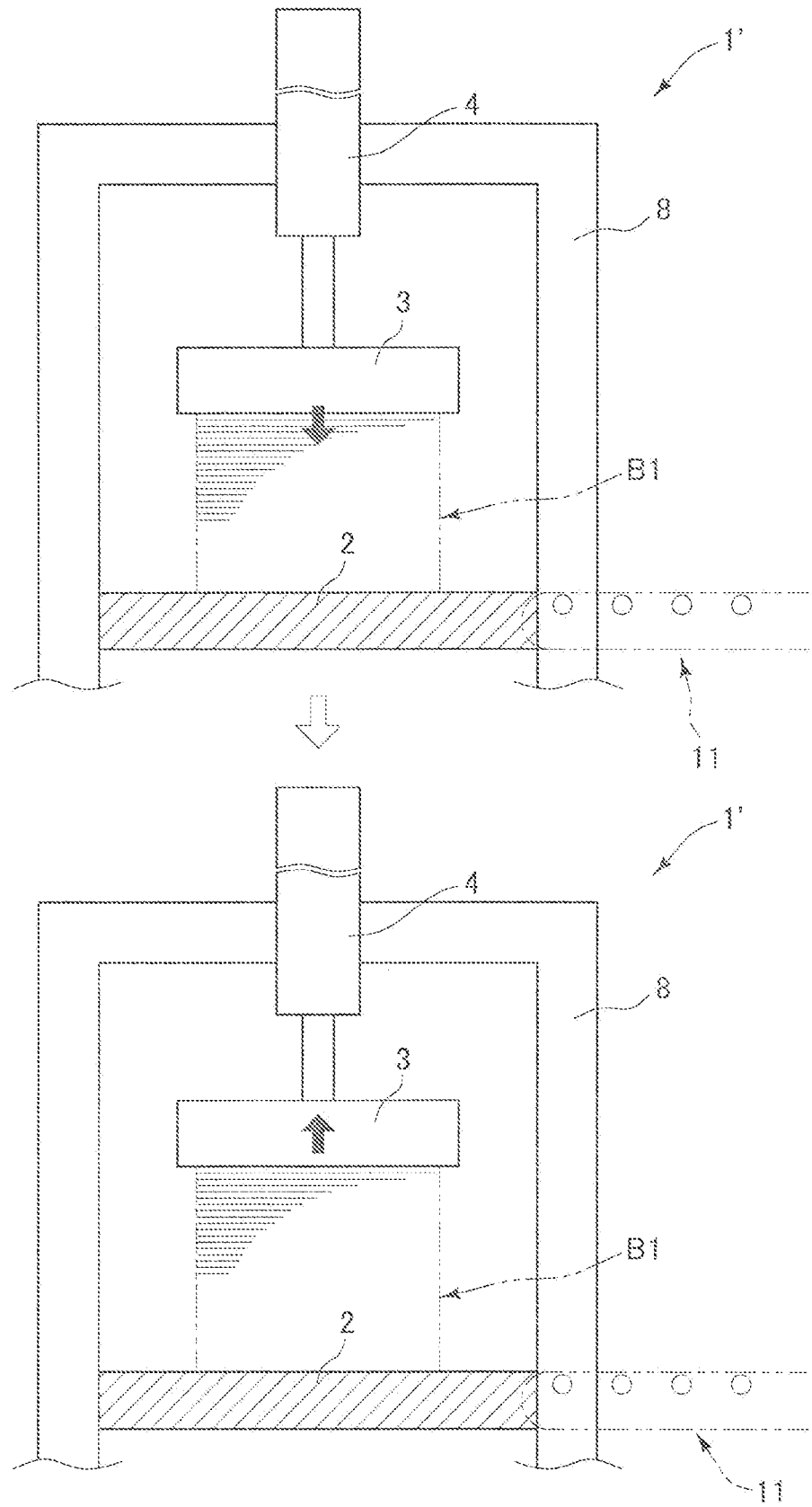
FIG. 31 is a front view illustrating a step subsequent to the illustration of FIG. 30.

The apparatuses illustrated in FIGS. 1, 25, and 26 respectively have the regulating members 5 and 72, the lifting and lowering cylinders 6 and 75 which move the regulating members 5 and 72 upward and downward, the lateral movement cylinders 13 and 76 which laterally move the regulating members 5 and 72, and the lifting cylinders 54. According to the dewatering method in which the apparatuses are used, the veneer laminate B1 sandwiched by the regulating members 5 and 72 is pressed from upward. As illustrated in FIG. 30, the method according to the invention may be performed by a dewatering apparatus 1' having such a simple structure that the support platen 2 and the press platen 3 are principal structural elements. The dewatering apparatus 1' does not include the regulating members 5 and 72, the lifting and lowering cylinders 6 and 75 which move the regulating members 5 and 72 upward and downward, the lateral movement cylinders 13 and 76 which laterally move the regulating members 5 and 72, and the lifting cylinders 54 (other structural characteristics are similar to the illustrations of FIGS. 1, 25, and 26).

Figure 32:
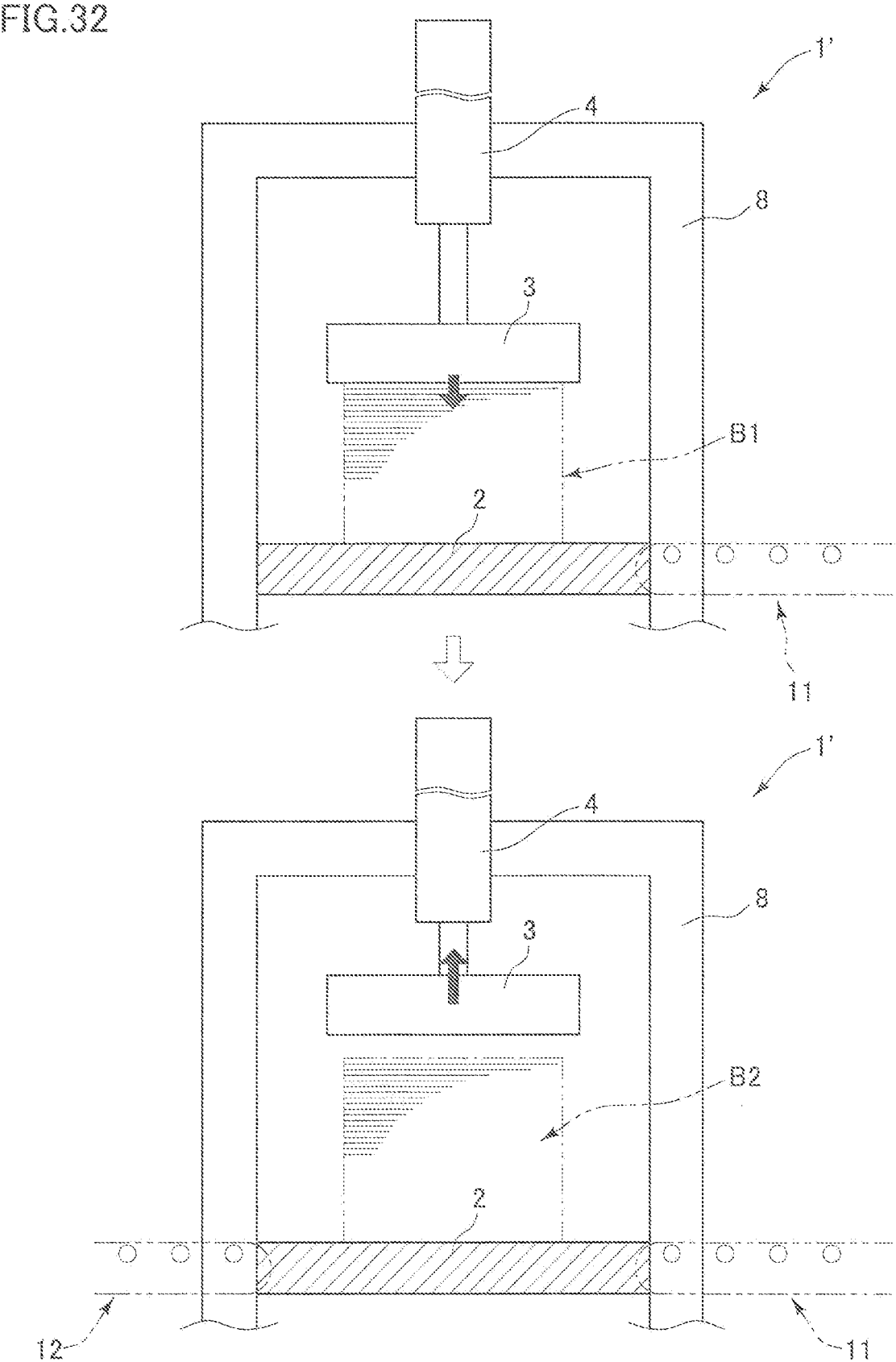
FIG. 32 is a front view illustrating a step subsequent to the illustration of FIG. 31.

When the apparatus 1' is used, the veneer laminate B1 placed on the support platen 2 is pressed by the press platen 3 moved downward by the pressing cylinder 4. The pressing force applied by the pressing cylinder 4 is released or weakened while the water contained in the veneer laminate B1 thus pressed is squeezed through the cut faces of the veneer laminate B1 and dripping downward. A negative pressure is accordingly generated in the cut faces of the veneer laminate B1, and the water dripping downward is suctioned into the fibers. Then, the pressing force is preferably applied again (second pressing) as illustrated in FIG. 32, and the veneer laminate B1 is dewatered so that the water contents in the veneer laminate B1 are less variable. After the dewatering treatment is over, the press platen 3 returns to the lift-up position, and the dewatered veneer laminate B2 is discharged. Then, the same steps are performed for the next veneer laminate B1.

In the example described thus far, the veneer laminate B1 is pressed to be dewatered, and the pressing force applied by the press platen 3 is released or weakened while the water is dripping downward. The timer 26 illustrated in FIGS. 1 and 30 may be used to determine based on test values previously obtained that the water is still dripping within a time t1 after the pressing started, and the drive pressure of the pressing cylinder 4 may be released or weakened in response to a time-up signal of the time t1 as a trigger. However, a different member may be used in place of the timer 26 as described below.

Figure 33:
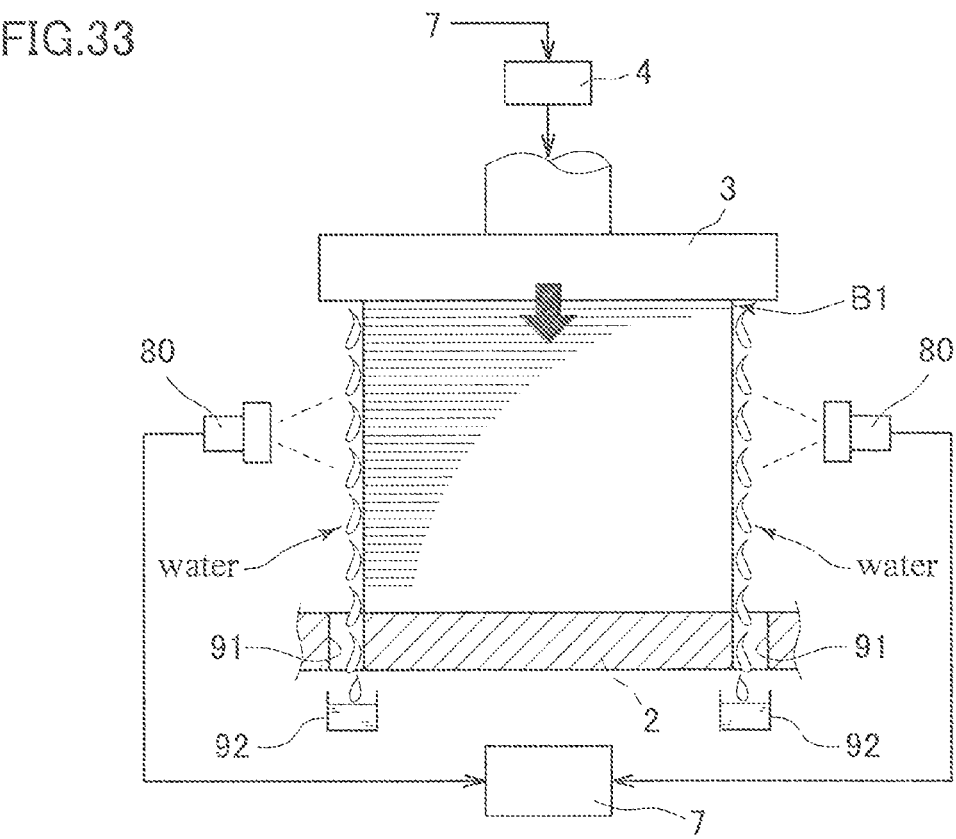
FIG. 33 is a schematic front view illustrating a first example of a method for detecting dripping water.

As illustrated in FIG. 33, image pickup cameras 80, for example, may be installed in place of the timer near the cut face gathering planes (perpendicular walls) of the veneer laminate B1. Image data of the cameras 80 is transmitted to the controller 7 (pressing controller), and the pressing controller 7 determines that the water pressed out of the veneer laminate is dripping downward when data indicating the dripping water, in other words, image (moving image) data including downward displacement is extracted from the image data, and the pressing controller 7 outputs a signal for releasing or weakening the drive pressure of the pressing cylinder 4 to the pressing cylinder 4 (to be precise, electromagnetic valve) while the water is still dripping. The water dripping on the side faces of the veneer laminate B1 travels through a water passage 91 formed in the support platen 2 to be collected by a tub 92 and then discharged from the tub 92.

Figure 34:
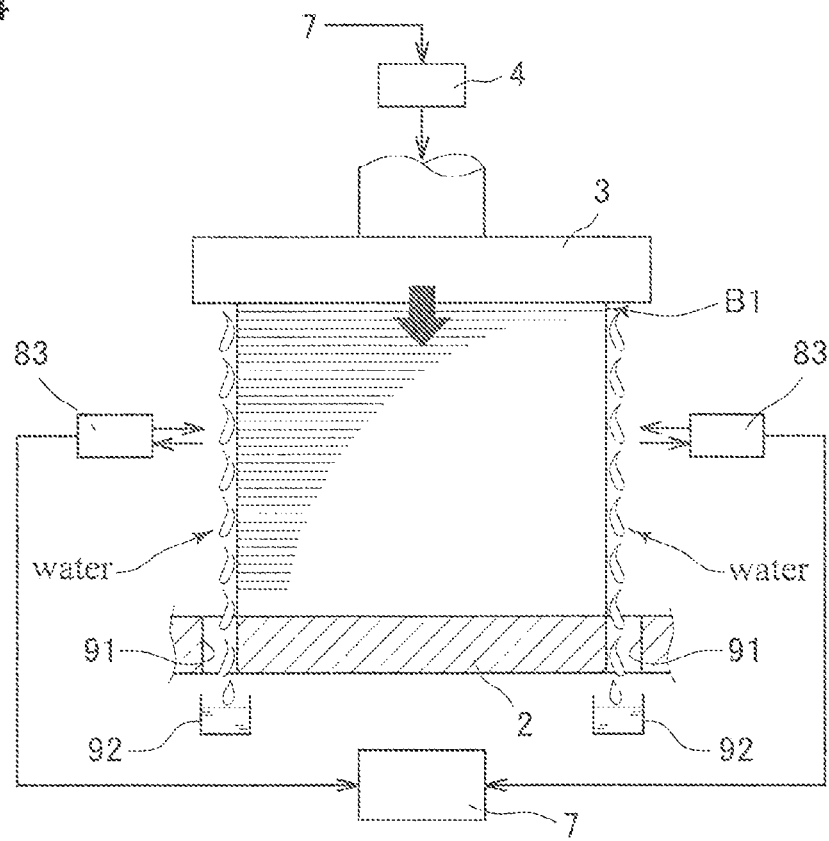
FIG. 34 is a front view illustrating a second example of the method.

As illustrated in FIG. 34, reflection sensors 83, such as optical sensors, may be provided so as to face the cut face gathering planes of the veneer laminate B1. Reflection signals, which are output from the reflection sensors 83 in response to water screens, water drops, or water stream while the water is dripping and reflected by the water screens on the cut face gathering planes and returned, are transmitted to the pressing controller 7, and the pressing controller 7 determines that the water is dripping on the cut face gathering planes of the veneer laminate B1 as far as levels of the reflection signals are equal to or larger than a predetermined threshold value and outputs a signal for releasing or weakening the drive pressure of the pressing cylinder 4 to the electromagnetic valve of the pressing cylinder 4.

Figure 35:
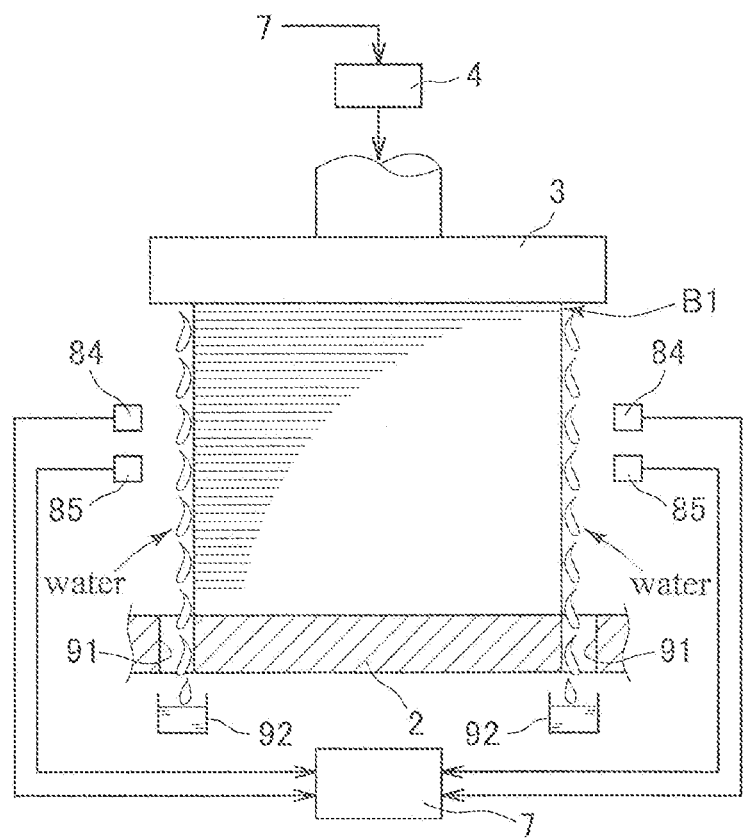
FIG. 35 is a front view illustrating a third example of the method.

As illustrated in FIG. 35, at least sound sensors 84 and/or temperature sensors 85 may be provided near the cut face gathering planes (perpendicular walls) of the veneer laminate B1. During the water is dropping, output levels of the sound sensors 84 which picked up the sound of the dripping water are equal to a certain value or higher, the temperature sensors 85 output values within a temperature variation or a predetermined temperature range because of the water dripping, and the pressing controller 7 checks at least one of the output signals of the sound sensors 84 and/or the temperature sensors 85 to release or weaken the drive pressure of the pressing cylinder 4.

Figure 36:
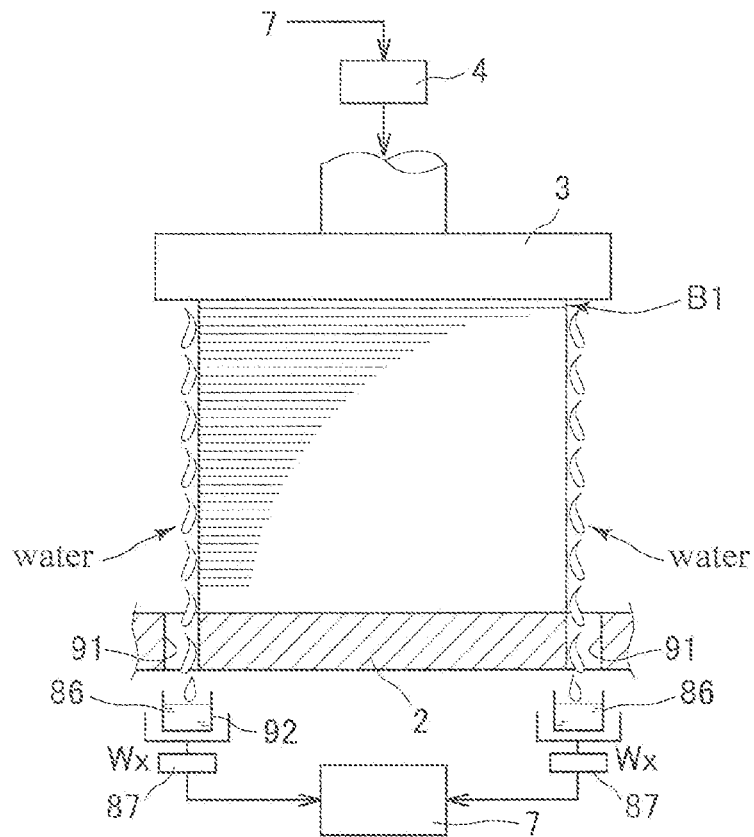
FIG. 36 is a front view illustrating a fourth example of the method.

As illustrated in FIG. 36, a container 86 may be provided to receive the water dripping along the cut face gathering planes of the veneer laminate B1 through the water passage 91 of the support platen 2. A weight sensor 87 measures a weight increase of the container 86 where the dripping water is stored. As long as the water is dripping, the weight of the container 86 where the water is stored keeps increasing. Therefore, the pressing controller 7, to which a signal from the weight sensor 87 is transmitted, determines whether an amount of the water stored in the container 86 increases based on the signal output from the weight sensor 87. The pressing controller 7, which detected any increase, outputs a signal for releasing or weakening the drive pressure of the pressing cylinder 4 during the increase to induce the compressed veneer laminate B1 to regain the original shape (swell), so that the water is suctioned into the fibers of the green veneers by a negative pressure suctioning action caused by the swell.

In the illustrations of FIGS. 33 to 36, detecting devices (80 to 87) which detect the water dripping are provided respectively on the cut face gathering planes of the veneer laminate B1 opposite to each other in parallel. However, these detecting devices (80 to 87) may be provided on one of the cut face gathering planes alone.

What is claimed is:

1. A dewatering method for correcting water contents of green veneers for plywood, the method including:
    a first step of vertically aligning green veneers, wherein a large number of green veneers for plywood respectively having water content and formed in a rectangular shape are vertically laminated, cut faces of the green veneers for plywood, which are end faces of the green veneers for plywood intersecting with a direction of fibers, are vertically aligned, the veneer laminate is located between upper and lower platen members so as to vertically form cut face gathering planes by two opposite side faces of the veneer laminate,
    a second step of moving the upper and lower platen members toward each other to apply a pressing force in the range of 20 to 50 kg/cm2 to the large number of laminated green veneers for plywood constituting the veneer laminate, and water contained in the green veneers for plywood is drawn through the cut faces of the green veneers for plywood and drips downward along the cut face gathering planes vertically formed where the cut faces of the green veneers for plywood are gathered, and a third step of releasing or weakening the pressing force applied to the veneer laminate in the range of 0 to 10 kg/cm2 under and subject to determining that the water is dripping downward based on output signals from detecting devices which are provided to detect the water dripping, and when the pressing force is released, the compressed veneer laminate swells under its own elasticity thereby generating a negative pressure in said fibers causing water to be suctioned into the fibers, and the pressing force in the range of 20 to 50 kg/cm2 is applied again to the large number of green veneers for plywood, so that each step is accomplished three times that ends with the application of pressing force by the second step can lessen a variability of the water content in the veneer laminate among the green veneers for plywood and in different parts of each of the green veneers for plywood while an overall water content of the veneer laminate is reduced.

2. The dewatering method for correcting water content of green veneers for plywood as claimed in claim 1, wherein the detecting devices are provided respectively on the cut face gathering planes of the veneer laminate opposite to each other in parallel.

3. The dewatering method for correcting water content of green veneers for plywood as claimed in claim 2, wherein the detecting devices are image pickup cameras which transmit to a pressing controller image data of the water dripping downward as output signals.

4. The dewatering method for correcting water content of green veneers for plywood as claimed in claim 2, wherein the detecting devices are optical sensors which transmit to a pressing controller reflection signals, which are output from the optical sensors in response to water screens, water drops, or water stream while the water is dripping.

5. The dewatering method for correcting water content of green veneers for plywood as claimed in claim 2, wherein the detecting devices are at least sound sensors and/or temperature sensors which transmit to a pressing controller output signals in response to the sound of the dripping water and/or a temperature variation or a predetermined temperature range because of the water dripping.

6. The dewatering method for correcting water content of green veneers for plywood as claimed in claim 2, wherein the detecting devices are weight sensors which transmit to a pressing controller output signals, which indicate weight increase of a container where the dripping water is stored.

\* \* \* \* \*